United States Patent [19]
Shirai

[11] Patent Number: 6,042,268
[45] Date of Patent: Mar. 28, 2000

[54] LINEAR ROLLER GUIDE DEVICE

[75] Inventor: Takeki Shirai, Ichikawa, Japan

[73] Assignee: THK Co., Ltd., Tokyo, Japan

[21] Appl. No.: 09/029,011

[22] PCT Filed: May 20, 1997

[86] PCT No.: PCT/JP97/01696

§ 371 Date: May 22, 1998

§ 102(e) Date: May 22, 1998

[87] PCT Pub. No.: WO97/48912

PCT Pub. Date: Dec. 24, 1997

[30] Foreign Application Priority Data

Jun. 18, 1996 [JP] Japan .................................. 8-177328
Dec. 28, 1996 [JP] Japan .................................. 8-358929

[51] Int. Cl.[7] .................................................. F16C 29/06
[52] U.S. Cl. .................................................. 384/44
[58] Field of Search .................... 384/44, 45, 43; 464/168

[56] References Cited

FOREIGN PATENT DOCUMENTS 63-91722  6/1988  Japan .

*Primary Examiner*—Lenard A. Footland
*Attorney, Agent, or Firm*—Armstrong, Westerman, Hattori, McLeland & Naughton

[57] ABSTRACT

An object is to increase structural rigidity of a movable block by improving a contacting structure and arranging relations of four rows of rollers disposed between the movable block and a track rail.

The device is characterized in that upper two rows of rollers 21, 22 are arranged to portions close to a center side from side ends of the upper surface of the track rail 1, while roller rolling surfaces 61, 62 corresponding to the rollers 21, 22 are formed to the upper surface of the track rail 1 and a lower surface of a horizontal portion 4 of the movable block 3, that lower two rows of rollers 23, 24 are arranged such that one row of rollers is disposed to right and left side surfaces of the track rail 1, respectively, while roller rolling surfaces 63, 64 corresponding to the lower two rows of rollers 23, 24 are formed to the right and left side surfaces of the track rail 1 and inner side surfaces of the supporting leg portions 5, 5 of the movable block 3.

15 Claims, 15 Drawing Sheets

FIG.8(a)
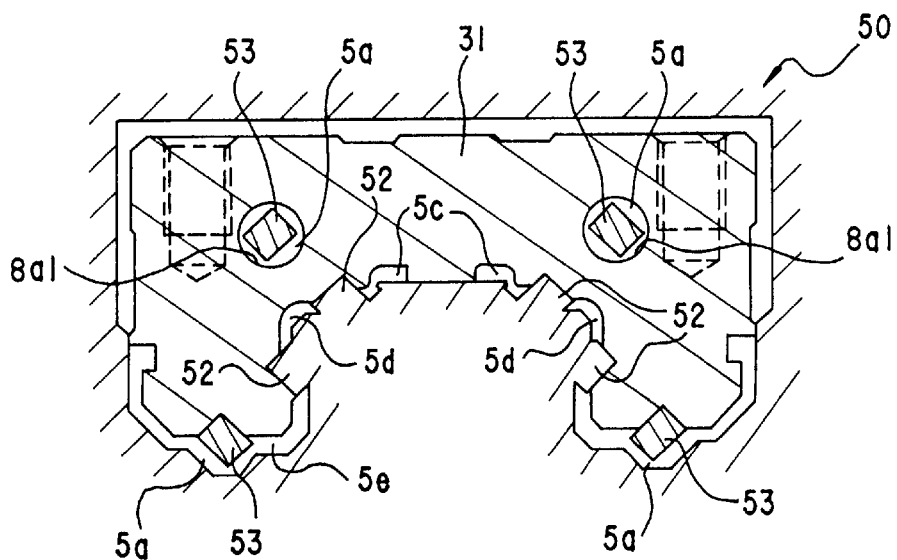
FIG.8(b)
FIG.8(c)
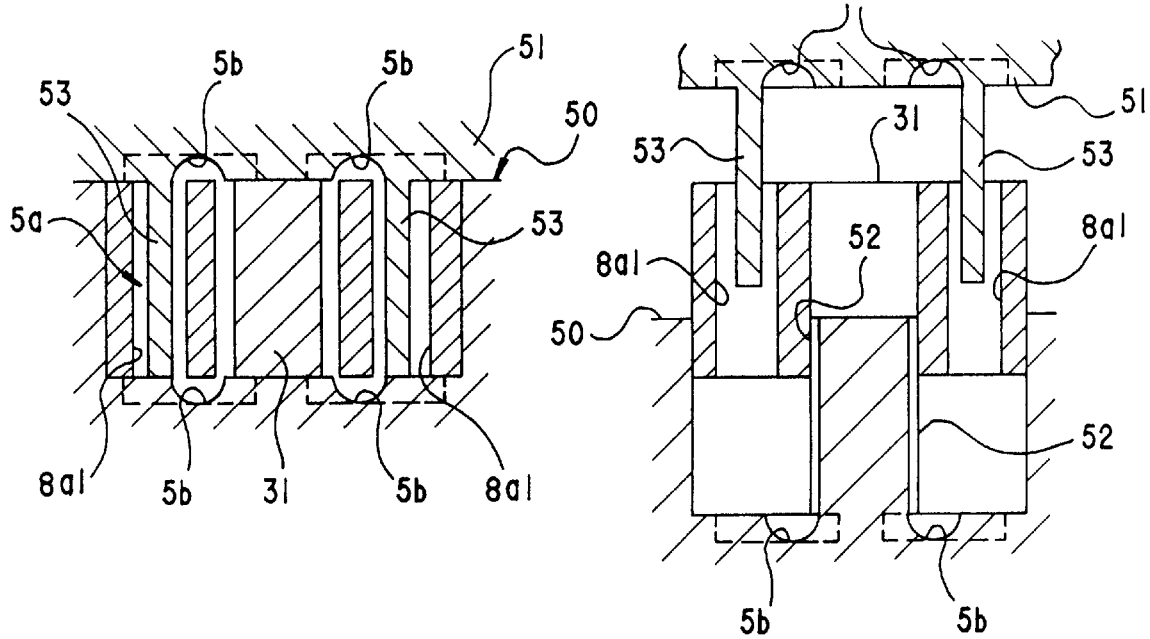

LINEAR ROLLER GUIDE DEVICE

TECHNICAL FIELD

The present invention relates to a linear roller guide device using rollers as rolling elements, and more particularly, to a linear roller guide device in which rigidity of a movable block is highly improved.

BACKGROUND ART

As a conventional linear roller guide device of this type, for example, a guide device shown in FIG. 15 is well known.

Namely, this linear roller guide device has a structure in which a movable block 102 is movably guided along a track rail 100 through a number of rollers 101 disposed to right and left portions of the track rail 100. Two rows of the rollers 101 are disposed to each of the right and left portions of the track rail 100 in vertical direction. As a result, four rows of rollers 101 in total are disposed to the track rail 100. Further, four rows of roller rolling surfaces 103 for rolling the four rows of rollers 101 are formed to the track rail 100 in an entire range in which the movable block 102 is moved.

On the other hand, the movable block 102 is provided with four rows of roller rolling surfaces 104 for clamping the rollers 101 so as to oppose to the roller rolling surfaces 103 formed to the track rail 100. The movable block 102 is also provided with four rows of roller circulating passages 105 in unloaded region for circulating the rollers 101 clamped between the roller rolling surfaces 103;104 from one ends to the other ends of the roller rolling surface 103 of the movable block 102.

These four rows of the rollers 101 are disposed in a form of four rows in total so that a pair of rows of rollers disposed vertically are arranged along each of right and left side surfaces of the track rail 100. These four rows of the rollers 101 have a contacting structure in which a contact angle line S constituted by a line orthogonal to center axes of the rollers 101 disposed in upper two rows is set so as to downwardly incline towards the track rail 100 with an inclination angle of almost 45 with respect to a horizontal line H, while a contact angle line S constituted by a line orthogonal to center axes of the rollers 101 disposed in a pair of lower two rows is set so as to upwardly incline towards the track rail 100 with an inclination angle of almost 45° with respect to a horizontal line H, thus adopting a contacting structure in which the loads applied from every four directions are equally supported by the rollers.

In the linear roller guide device described above, however, there was posed a problem that a high rigidity property inherent in the roller 101 cannot be utilized.

In the case of this linear roller guide device, if deformations to be caused by pre-load or external loads applied to the movable block are not eliminated, a contacting state of the rollers 101 with respect to the roller rolling surfaces 103 and 104 are changed, so that a preferable result excellent in rigid performance cannot be obtained.

Namely, conventionally, the paired upper and lower rows of rollers 101 are arranged along the right and left side surfaces of the track rail 100 so as to be apart from each other in a vertical direction, so that a length L from a base portion of a supporting leg portion 106 of the movable block 102 to the lower roller 101 is made long. As a result, when the preload is applied to the roller 101 or when a load in a horizontal direction is applied to an upper surface of the movable block 102 from the right or left direction as an external load, a moment applied in a direction spreading the supporting leg portion 106 is disadvantageously increased.

Further, when a lifting load (i.e., a load applied in a direction detaching the movable block 102 from the track rail 100) is applied as the external load, a force directing upward is applied to upper surfaces of both right and left end portions of the movable block 102 through screw holes 109 formed at upper surfaces of both right and left end portions of the movable block 102. As a reaction of the upward force, a force directing downward is applied to the roller rolling surfaces 104 of the lower side of the rollers 101. These vertically balancing forces are applied so as to be apart from each other with a lateral distance M between the screw hole 109 and the lower side roller 101, so that a bending moment in a direction for spreading the supporting leg portion 106 will occur.

The bending moment due to this lifting load is caused by separating the screw hole 109 from the lower side roller 101 to each other in a horizontal direction, so that it is ideal to locate the screw hole 109 and the lower side roller 101 at the same position. However, due to exitence of the roller circulating passages 105 in unloaded region, it is difficult to form the screw hole 109 to a central portion of the movable block 102.

With respect to the bending moment to be applied to these supporting leg portions 106, a flexural rigidity at a horizontal portion 107 of the movable block 102 copes with the bending moment. However, when a thickness of the horizontal portion 107 is increased, a height dimension of the movable block 102 will be disadvantageously increased.

Further, conventionally, a skew of the roller 101 has been prevented by retaining both end surfaces of the roller 101 in an axial direction thereof by means of a vertical wall 104a and a roller end surface guide member 108, the vertical wall 104a being provided to one side periphery of the roller rolling surface 104 of the movable block 102 while the roller end surface guide member 108 being provided to the other side periphery of the roller rolling surface 104.

In this regard, the skew is a phenomenon of the roller 101 being rolled in a state where a central axis of the roller 101 is inclined with respect to an axis orthogonal to the rolling direction of the roller 101. When this skew occurs, an excessive stress concentration will occur at the end portion of the roller 101 to thereby cause a deterioration in durability of the roller 101 and the roller rolling surfaces. Therefore, the generation of the skew must be sufficiently prevented.

However, even if the roller end surface guide member 108 is provided as conventionally made, when the movable block 102 per se is deformed as described above, the roller rolling surface 104 is displaced. As a result. thus bringing into the sane result as in the skew generation.

Furthermore, in a conventional art, since the roller end surface guide member 108 for retaining the roller 101 is interposed between the horizontal portion 107 and the upper surface of the track rail 100, a space for installing the roller end surface guide member 108 is required to a portion between the horizontal portion 107 and the upper surface of the track rail 100. As a result, the thickness of the horizontal portion 107 of the movable block 102 is obliged to be decreased and the rigidity thereof cannot be set to a large level.

The present invention has been achieved for solving the problems encountered to the prior art described above, and an object of this invention is to provide a linear roller guide device capable of increasing a structural rigidity of the movable block by improving the arranging relations of the rollers.

Another object of the present invention is to provide a linear roller guide device capable of sufficiently extending a contact length of the roller and sufficiently realizing high-rigidity characteristics of the roller by improving structures of the roller end surface guide portion and the roller retaining portion.

DISCLOSURE OF THE INVENTION

In order to achieve the afore-mentioned object, the present invention provides a linear roller guide device in which a movable block is guided along a track rail through four rows of rollers disposed on the track rail, wherein the movable block comprises a horizontal portion opposing to an upper surface of the track rail and supporting leg portions projected downwardly from both end portions of the horizontal portion so as to oppose to right and left side surfaces of the track rail, wherein the track rail is provided with four rows of roller rolling surfaces for rolling and guiding the rollers in an entire range of the track rail in which the movable block is moved, and wherein, on the other hand, the movable block comprises four rows of roller rolling surfaces opposing to the roller rolling surfaces of the track rail for rollingly clamping the four rows of rollers and four rows of roller circulating passages provided at unloaded region for circulating the rollers clamped between the roller rolling surfaces of the track rail and the movable block from one end portion to the other end portion of the roller rolling surface of the movable block, the linear motion guide device being characterized in that an upper two rows of rollers among the four rows of rollers are arranged to a portion close to a center side from a side end of the upper surface of the track rail, while roller rolling surfaces corresponding to the upper two rows of rollers are formed to the upper surface of the track rail and the lower surface of the horizontal portion of the movable block, that the lower two rows of rollers among the four rows of rollers are arranged such that one row of rollers is disposed to an upper portion of right and left side surfaces of the track rail, respectively, while roller rolling surfaces corresponding to the lower two rows of rollers are formed to the right and left side surfaces of the track rail and inner side surfaces of the supporting leg portions of the movable block, that the upper two rows of rollers has a structure in which a line orthogonal to a rotation axis of the roller is inclined with respect to a vertical line with a predetermined inclination angle, and that the lower two rows of rollers has a structure in which a line orthogonal to a rotation axis of the roller is inclined with respect to a horizontal line with a predetermined inclination angle so as to upwardly extend towards a side of the track rail.

According to the structure described above, since the upper two rows of rollers are arranged to a portion close to center side from the end portion of the upper surface of the track rail and the lower two rows of the rollers are arranged to upper portions of the right and left side surfaces of the track rail, the lengths from the base portion of the right and left supporting leg portions of the movable block to the lower side rollers can be shortened in comparison with a conventional case where the two rows of rollers are arranged to the right and left sides surfaces of the track rail, respectively.

Accordingly, even if a reaction force of the preload applied to the roller or a lateral load acting in a direction so as to displace the movable block in a horizontal direction with respect to the track rail is applied, it becomes possible to decrease the bending moment acting in a direction spreading the supporting leg portions.

Further, in general, due to the moment acting in a direction spreading the supporting leg portions, a center portion of the horizontal portion is bent so as to close to the upper surface of the track rail. However, in the present invention, a bending deformation of the horizontal portion is suppressed by the action of the upper two rows of rollers disposed between the horizontal portion and the upper surface of the track rail, whereby the spreading of the supporting leg portions can be sufficiently decreased in co-operation with the reduction of the bending moment.

As described above, even if the preload is applied to the roller or a lateral load in a horizontal direction is applied, the deformation in a direction spreading the supporting leg portions of the movable block can be prevented and a degree of parallelization between the opposing roller rolling surfaces can be maintained to a constant level, whereby non-uniform contact of the rollers can be prevented.

In another aspect of this invention, the linear motion guide device may have a structure in which the upper two rows of rollers are arranged to portions close to a center side portion deviated from a side end of the upper surface of the track rail, while the roller circulating passages in unloaded region are also arranged to portions close to the center side portion with respect to the roller circulating passages in unloaded region corresponding to the lower two rows of the rollers, and wherein a screw hole for fixing the movable block is provided at portions on the upper surface of right and left end portions of the horizontal portion of the movable block, and the portions are set to upper positions of the roller circulating passages in unloaded region for the lower two rows of rollers or set to positions close to the center side.

When a lifting load in a direction so as to detach the movable block from the track rail is applied, a force directing upward is applied to the movable block through the screw holes. As a reaction of the upward force, a force directing downward is applied to the roller rolling surfaces of the lower side of the rollers. These vertically balancing forces are applied so as to be apart from each other with a lateral distance between the screw hole and the lower side roller, so that a bending moment in a direction for spreading the supporting leg portion will occur.

This bending moment is also basically supported by the upper two rows of rollers disposed between the horizontal portion and the upper surface of the track rail, thereby to sufficiently decrease the spreading of the supporting leg portions.

In general, the bending moment due to this lifting load is caused by separating the screw hole from the lower side roller so as to be apart from each other in a horizontal direction, so that it is ideal to form the screw hole and the lower side roller at the same position. However, due to existence of the roller circulating passages for the upper two rows of rollers in unloaded region, it is difficult to form the screw hole to a central portion of the movable block.

As a countermeasure of the above matter, in the present invention, the upper two rows of rollers are arranged to portions close to a center side portion deviated from a side end of the upper surface of the track rail, while the roller circulating passages in unloaded region corresponding to the upper two rows of rollers are also arranged to portions close to the center side portion with respect to the roller circulating passages in unloaded region corresponding to the lower two rows of the rollers, whereby an interference of the upper two rows of the rollers with the roller circulating passages can be avoided.

Simultaneously, the screw hole is provided at the roller circulating passages in unloaded region for the lower two rows of rollers or inside of the roller circulating passages, whereby the length in the horizontal direction between the screw hole and the lower side rollers is sufficiently shortened.

According to the structure described above, not only in a case when the preload is applied to the roller or the lateral load is applied but also in a case when the lifting load is applied, the moment can be decreased, the deformation in a direction so as to spread the supporting leg portions is prevented, and the degree of parallelization between the roller rolling surfaces is maintained to a constant level whereby the non-uniformity in contacting of the rollers can be prevented.

Further, when an angle between a line orthogonal to the rotation axis of each of the upper two rows of rollers disposed on the upper surface of the track rail and a vertical line is set at almost 45° and an angle between a contact angle line of the lower two rows of rollers disposed on the side surfaces of the track rail and a horizontal line is set at almost 45°, the same rated load can be obtained with respect to a radial load applying from upper direction (i.e., a load in a direction pressing the movable block onto the track rail), lifting load and the lateral loads applied from right and left directions, whereby any of the load applied from every direction can be supported. In other words, the device can be used in any attitudes or positions, and available to wide applications.

Further, it is effective to adopt a structure in which a track rail having a track groove having a V-shape in cross section comprising two inclined surfaces is used, and the roller rolling surfaces to be formed to the track rail and the movable block so as to correspond to the four rows of rollers are formed to one of the inclined surfaces while the other inclined surface is used as a guide surface for guiding the roller end surfaces, whereby the end surfaces of the rollers are guided while a pitch of the rollers is maintained to a predetermined value in a portion between the guide surface of the track groove of the track rail side and the guide surface of the movable block side which are opposed to each other.

If the track groove is formed to have a V-shaped in cross section described above, a locating relation between the respective track grooves can be accurately measured by using a roller pin, whereby the locating relation between the respective track grooves can be molded or formed with a high accuracy. Accordingly, the four rows of rollers disposed between the track rail and the movable block accurately contact to the roller rolling surfaces formed to a pair of track grooves corresponding to the four rows of rollers, and the end surfaces of the roller are accurately guided by the action of the guide surfaces of the paired track grooves.

As described above, the movable block has a rigidity regardless of the direction of the loads, so that the locating relation between the track rail and the movable block is normally maintained to a constant value. Further, the movable block is supported by the track rail at a position where the preload applied to the respective four rows of rollers and the reaction force of the preload are balanced, so that a gap between the end surface of the roller and the guide surface can be normally maintained to a constant level in co-operation with the effect of accurately forming the locating relation between the respective track grooves as described above.

In particular, the movable block is formed in a shape having a high rigidity, so that a high preload can be applied. Therefore, the high rigidity of the movable block and the high preload are synergistically effected to realize an effect such that the gap between the end surface of the roller and the guide surface can be maintained to a constant level. As a result, the skew preventing effect for the roller can be enhanced and a smooth circulation and a rolling accuracy of the rollers can be secured.

Further, the space for installing the roller end surface guide member, which is conventionally required to be provided to the lower surface of the movable block, becomes unnecessary in this invention, so that the thickness of the horizontal portion of the movable block can be increased with an amount equivalent to the space, whereby the the flexural rigidity of the horizontal portion can be increased and also the rigidity of the movable block can be enhanced. In addition, by enhancing the rigidity of the movable block, the effect of preventing the skew generation can be further synergistically improved.

When the roller rolling surfaces and the end surface guide surfaces are constituted by the track groove having a V-shape in cross section, the roller rolling surfaces and the end surface guide portions of the track groove can be simultaneously finished by a grinding work, so that a guiding accuracy of the rollers and surface roughness are improved and an enhanced effect in skew prevention can be obtained. In addition, the working amount for the track groove can be minimized.

Further, when a retainer for the roller is eliminated and the roller contacts to the roller rolling surface at an entire length of the roller, the rigidity of the roller per se can be effectively utilized.

Further, another invention is as follows.

Namely, there is also provided a linear roller guide device in which a movable block is guided along a track rail through rollers disposed on the track rail, wherein the track rail is provided with roller rolling surfaces for rolling and guiding the rollers, and wherein, on the other hand, the movable block comprises roller rolling surfaces opposing to the roller rolling surfaces formed to the track rail for rollingly clamping the rollers and roller circulating passages provided at unloaded region for circulating the rollers clamped between the roller rolling surfaces of the track rail and the movable block from one end portion to the other end portion of the roller rolling surface of the movable block, the linear motion guide device being characterized in that a first end surface guide portion for guiding one end surface of the roller is provided to one side periphery of the roller rolling surface formed to the movable block so as to rise up at an almost right angle with respect to the roller rolling surface, while a second end surface guide portion for guiding the other end surface of the roller is provided to the other side periphery of the roller rolling surface formed to the track rail so as to rise up at an almost right angle with respect to the roller rolling surface, that a radial direction retaining portion having a projection for preventing the roller from falling out in a radial direction by being engaged with a peripheral corner portion of the roller end surface is provided to one side periphery of the roller rolling surface formed to the track rail, while the roller is contacted to the roller rolling surface formed to the track rail at an almost entire contact length in a peripheral surface of the roller except an engaging width required for engaging with the radial direction retaining portion, and that, on the other hand, an axial direction retaining portion for preventing the roller from falling out in an axial direction is provided to a side periphery of the roller rolling surface formed to the movable block, the side periphery being opposite to the side periphery to which the first end surface guide portion is provided.

According to this invention, one end surface of the roller is guided by the first end surface guide portion provided to one side periphery of the roller rolling surface formed to the movable block, while the other end surface of the roller is guided by the second end surface guide portion provided to the other side periphery of the roller rolling surface formed to the track rail, whereby the skew of the roller can be prevented.

In this regard, the skew is a phenomenon of the roller being rolled in a state where a central axis of the roller is inclined with respect to an axis orthogonal to the rolling direction of the roller. When this skew occurs, an excessive stress concentration will occur at the end portion of the roller to thereby cause a deterioration in durability of the roller and the roller rolling surfaces. Therefore, the generation of the skew must be sufficiently prevented.

In the present invention, the roller end surfaces are guided by the first and second end surface guide portions, whereby the center axis of the roller is maintained in an orthogonal direction with respect to the rolling direction of the roller.

On the other hand, when the movable block is detached from the track rail, the second end surface guide portion provided to the track rail is also detached from the other end surface of the roller. However, the roller is retained between the first end surface guide portion provided to one side of the roller rolling surface formed to the movable block and the axial direction retaining portion provided to the other side periphery thereof, so that the falling-out of the roller in an axial direction can be prevented.

Further, a peripheral portion of the one end surface of the roller is retained by the radial direction retaining portion provided to a portion of the track rail side from the first end surface guide portion with respect to the roller rolling surface, so that the falling-out of the roller in a radial direction can be also prevented.

As described above, the radial direction retaining portion is engaged with only a periphery of the one end surface of the roller, and the second end surface guide portion is provided to the other side periphery of the roller rolling surface formed to the track rail, so that a peripheral surface of the roller except the engaging portion for engaging with the radial direction retaining portion can be contacted to the roller rolling surface formed to the track rail so that the end surface is closely contacted to the second end surface guide portion, whereby the contact length of the roller can be sufficiently secured in a long length. Accordingly, the high rigidity characteristic of the roller can be sufficiently utilized.

In another aspect of this invention, the linear motion guide device is characterized in that the first end surface guide portion is integrally formed with a member for constituting a block body of the movable block.

According to this structure, the block body and the first end surface guide portion can be worked so as to have a high rigidity and high accuracy, and the end surfaces of the roller are guided in a portion between the first end surface guide portion and the second end surface guide portion provided to the track rail also having a high rigidity, whereby the skew generation can be further securely prevented.

In still another aspect of this invention, the device is characterized in that the first end surface guide portion is integrally formed with the block body by inserting the block body into a molding die.

According to this structure, the end surface guide portions can be accurately positioned without causing any attaching error, and the gap between the roller end surface and the first end surface guide portion can be further decreased without impairing the circulating motion of the rollers, so that the skew preventing effect for the roller can be enhanced.

Further, when this first end surface guide portion is constituted by a resin member, the roller end surface is guided by the resin member, so that a friction resistance is decreased whereby a smoothness in roller guiding can be increased.

Furthermore, the roller end surface would not wear, so that the skew prevention can be stably secured.

In still another aspect of this invention, the linear motion guide device is characterized in that a guide wall opposing to the roller end surface in a non-contact state is provided to one side periphery of the roller rolling surface formed to the movable block, the radial direction retaining portion is provided to an end portion of the guide wall, and the first end surface guide portion contacting to a circumferential portion of the roller end surface is constituted by an opposing surface of the radial direction retaining portion so that the opposing surface is opposed to the roller end surface.

According to this structure, contact areas of the first end surface guide portion and the roller end surface are decreased, so that a friction resistance can be decreased whereby a smoothness in roller circulation can be increased.

When both the first and second end surface guide portions are integrally formed with the block body by inserting the block body into a molding die, both the radial and axial direction retaining portions can be accurately positioned without causing any attaching error, so that a predetermined gap between the roller and the radial direction retaining portion or the axial direction retaining portion can be accurately formed during the rolling of the rollers, whereby the roller would not interfere with the radial and axial direction retaining portions. Accordingly, the rollers are smoothly rolled and moved in co-operation with the skew preventing effect for the rollers by the action of the first and second end surface retaining portions.

On the other hand, the linear motion guide device is characterized in that the roller circulating passage in unloaded region comprises an unloaded roller returning passage extending in an axial direction and a direction changing passage for connecting both ends of the unloaded roller returning passage to both ends of a roller rolling passage in loaded region to be formed between the opposing roller rolling surfaces of the track rail and the block body, wherein a direction changing passage inner periphery member for constituting an inner periphery portion of the direction changing passage, together with both radial and axial direction retaining portions, are integrally formed with the block body by inserting the block body into a molding die.

According to this structure, a connected portion of the loaded roller rolling surface and the direction changing passage inner periphery portion can be continuously formed without causing irregularities, so that the rollers are smoothly rolled and moved.

Further, in still another aspect of this invention, the linear motion guide device is characterized in that an unloaded roller returning passage member for constituting the unloaded roller returning passage, together with the direction changing passage inner periphery member and both the radial and axial direction retaining portions, are integrally formed with the block body by inserting the block body into a molding die.

According to this structure, each of the connected portions between the loaded roller rolling surface, the direction changing passage inner periphery portion and the unloaded roller returning passage can be continuously formed without causing irregularities, so that the rollers are smoothly circulated and moved in all around a circulating passage.

Further, in still another aspect of this invention, the linear motion guide device is characterized in that the direction changing passage inner periphery member and the unloaded roller returning passage member are integrally provided with an end surface guide portion for guiding at least one end surface of the roller.

According to this structure, the end surface guide portions of the direction changing passage inner periphery member and the unloaded roller returning passage member are continuously formed without causing irregularities, so that the skew of the roller can be prevented in all around the circulating passage and the rollers are smoothly circulated.

In still another aspect of this invention, the linear motion guide device is characterized in that four rows of rollers are provided in total among which two rows of the rollers are disposed on an upper surface of a track rail, and one row of the rollers is disposed to right and left side surfaces of the track rail, respectively, wherein the movable block comprises a horizontal portion opposing to the upper surface of the track rail and supporting leg portions each extending downwardly from both ends of the horizontal portion and opposing to the right and left side surfaces of the track rail, wherein among the four rows of the rollers, two rows of the rollers disposed on the upper surface of the track rail are arranged to portions close to a center side apart from a side end of the upper surface of the track rail with a predetermined distance, while roller rolling surfaces corresponding to the upper two rows of rollers are formed to the upper surface of the track rail and the lower surface of the horizontal portion of the movable block, and roller rolling surfaces corresponding to the lower two rows of rollers are formed to the right and left side surfaces of the track rail and inner side surfaces of the supporting leg portions of the movable block, wherein the upper two rows of rollers has a structure in which a line orthogonal to a rotation axis of the roller is inclined with respect to a vertical line at a predetermined inclination angle, and wherein the lower two rows of rollers has a structure in which a line orthogonal to a rotation axis of the roller is inclined with respect to a horizontal line at a predetermined inclination angle so as to upwardly extend towards a side of the track rail.

According to the structure described above, when the upper two rows of rollers are arranged to portions close to center side apart from the end portion of the upper surface of the track rail and the lower two rows of the rollers are arranged to upper portions of the right and left side surfaces of the track rail, the lengths from the base portions of the right and left supporting leg portions of the movable block to the lower side rollers can be shortened in comparison with a conventional case where the two rows of rollers are arranged to the right and left sides surfaces of the track rail, respectively.

Accordingly, even if a reaction force of the preload applied to the roller or a lateral load acting in a direction so as to displace the movable block in a horizontal direction with respect to the track rail is applied, it becomes possible to decrease the bending moment acting in a direction so as to spread the supporting leg portions.

Further, in general, due to the moment acting in a direction so as to spread the supporting leg portions, a center portion of the horizontal portion is bent so as to close to the upper surface of the track rail. However, in the present invention, a bending deformation of the horizontal portion is suppressed by the action of the upper two rows of rollers disposed between the horizontal portion and the upper surface of the track rail, whereby the spreading of the supporting leg portions can be sufficiently decreased in co-operation with the reduction of the bending moment.

As described above, even if the preload is applied to the roller or a lateral load in a horizontal direction is applied, the deformation in a direction so as to spread the supporting leg portions of the movable block can be prevented and a degree of parallelization between the opposing roller rolling surfaces can be maintained to a constant level, whereby non-uniform contact of the rollers can be prevented.

BRIEF DESCRIPTION OF THE DRAWINGS

FIG. 5 is a view showing another embodiment of a linear roller guide device according to the present invention in which

FIGS. 8(a)–(c) are views each showing a molding state of the linear roller guide device shown in FIG. 1.

BEST MODE FOR EMBODYING THE INVENTION

Hereunder, the present invention will be explained with reference to the accompanying drawings.

Figure 1A:
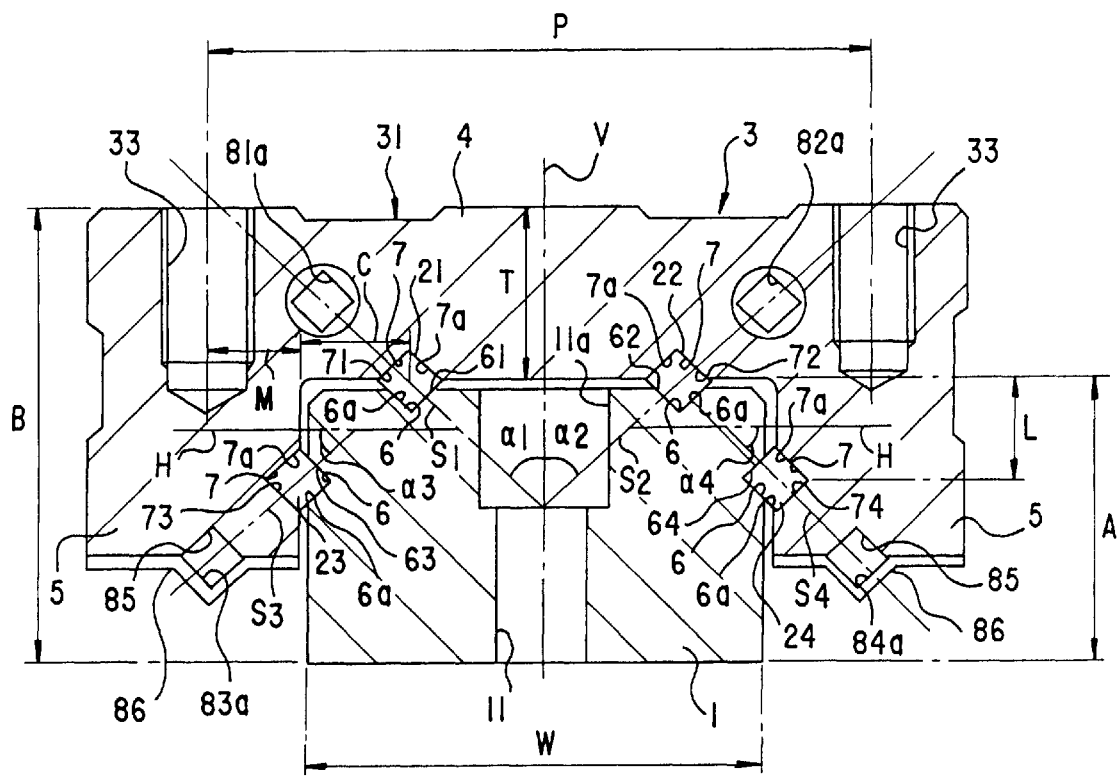
FIG. 1 is a view showing one embodiment of a linear roller guide device according to the present invention.
Figure 1B:
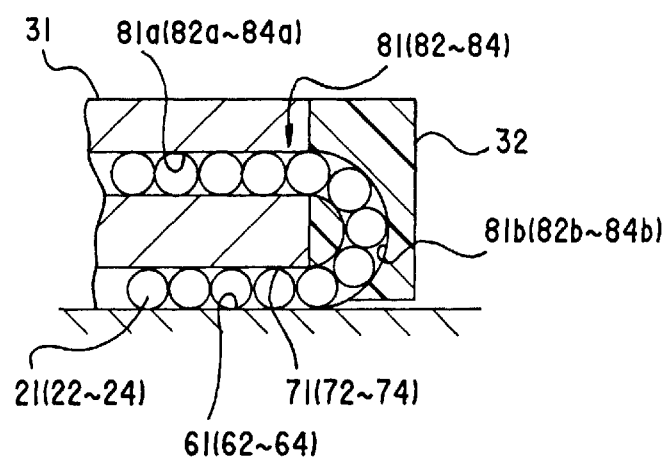
Figure 2:
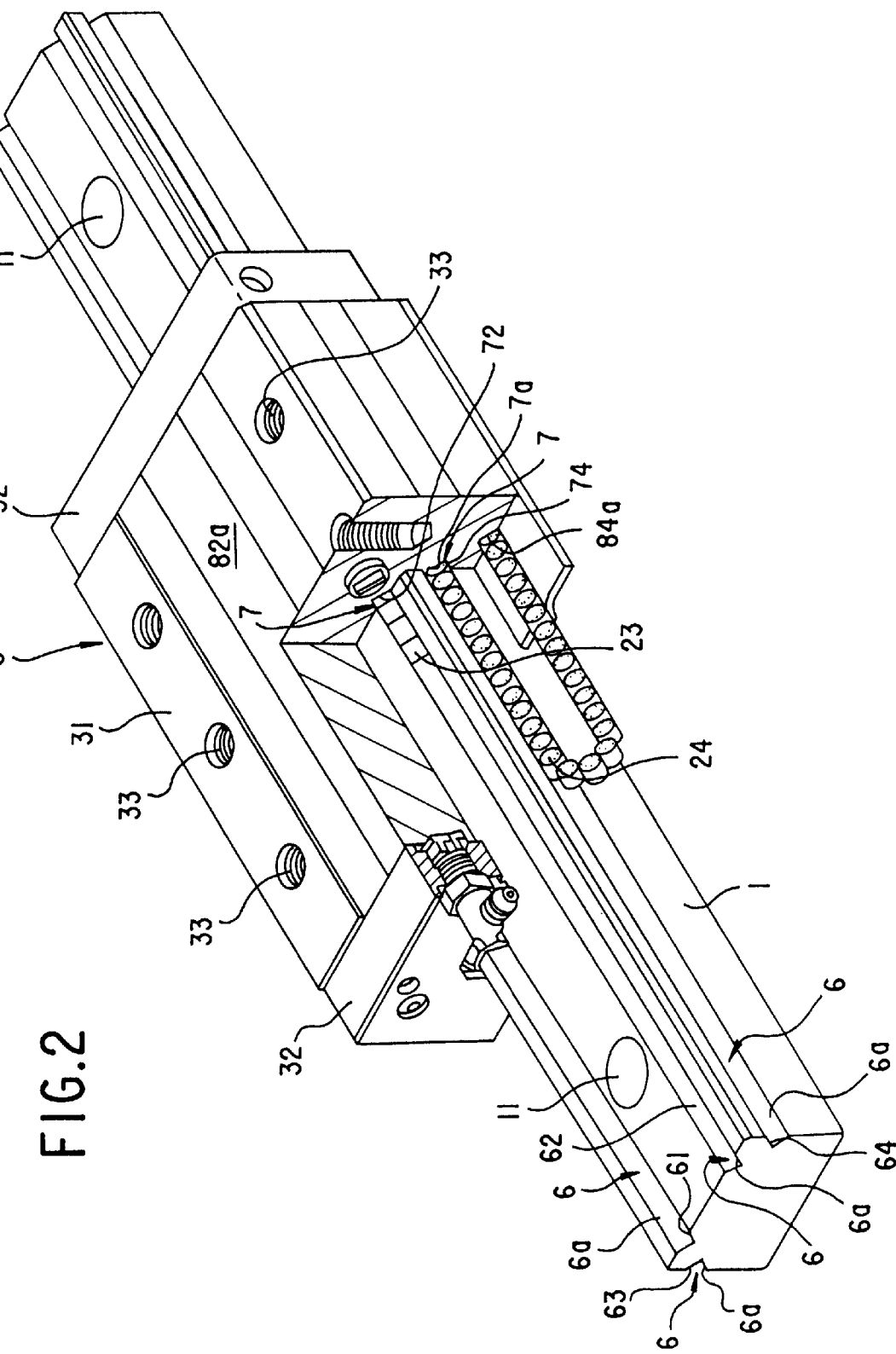
FIG. 2 is a perspective view partially in section of the linear roller guide device shown in FIG. 1.

FIGS. 1 and 2 are views showing an embodiment of a linear roller guide device according to the present invention. The linear roller guide device has a structure in which a number of rollers 21–24 are arranged in a form of four rows of rollers in total of which two rows of rollers are vertically disposed to right and left portions of a track rail 1 respectively, and a movable block 3 is guided along a track rail 1 through a number of rollers 21–24.

The movable block 3 comprises a horizontal portion 4 opposing to an upper surface of the track rail 1, and supporting leg portions 5, 5 extending downwardly from both end portions of the horizontal portion 4 so as to oppose to right and left side surfaces of the track rail 1.

The track rail 1 has a rectangular shape in section, an upper surface of the track rail is formed with two rows of roller rolling surfaces while each of right and left side surfaces of the track rail is formed with one row of roller rolling surface, respectively, i.e., totally four rows of the roller rolling surfaces 61–64 are formed to the track rail 1 over entire length of a range in which the movable block 3 is moved. Further, the track rail 1 is forced with a plurality of bolt insertion holes 11 for fixing the track rail in a longitudinal direction, and an upper opening portion of each bolt insertion holes 11 is formed at a center of the upper surface of the track rail 1.

On the other hand the movable block 3 is provided with four rows of roller rolling surfaces 71–74 for rollingly clamping the four rows of rollers 21–24 so as to oppose to the roller rolling surfaces 61–64 of the track rail 1. The movable block 3 is also provided with four rows of roller circulating passages 81–84 at unloaded region for circulating the rollers 21–24 clamped between the roller rolling surfaces 61, 71; 62, 72; 63, 73; 64, 74 formed to the track rail 1 and the movable block 3 from one end to the other end of the roller rolling surfaces 71–74 of the movable block 3.

The movable block 3 comprises a block body 31 and side covers 32, 32 to be attached to both end surfaces in an axial direction of the block body 31. The roller rolling surfaces 61–64 are formed to the block body 31. The roller circulating passages 81–84 comprises roller returning passages 81a–84a formed to the block body 31 so as to be in parallel to each of the roller rolling surfaces 61–64 and direction changing passages 81b–84b having a U-shape to be formed to the side covers 32, 32.

The roller returning passages 81a, 82a for the upper two rows of rollers 21, 22 are constituted by penetration bores penetratingly formed to the block body 31. Each of the roller returning passages 83a, 84a for the lower two rows of rollers 23, 24 has a rectangular shape in cross section and comprises an inverse V-shaped groove 85 formed to lower end surface of the supporting leg portion 5, and a retainer 86 having a V-shape in cross section for covering the groove 85.

The upper two rows of rollers 21, 22 are arranged to portions close to a center side from side ends of the upper surface of the track rail with a predetermined distance C, while roller rolling surfaces 61, 71; 62, 72 corresponding to the upper two rows of rollers 21, 22 are formed to the upper surface of the track rail 1 and the lower surface of the horizontal portion 4 of the movable block 3.

Further, the roller returning passages 81a, 82a constituting the upper two rows of the roller circulating passages together with the roller returning passages 81a in unloaded region are arranged to portions close to center side portion with respect to the roller circulating passages 83a, 84a in unloaded region corresponding to the lower two rows of the rollers 23, 24.

In addition, a screw hole 33 for fixing the movable block is provided at portions on the upper surface of both right and left end portions of the horizontal portion 31 of the movable block, and the portions are set to upper positions of the roller returning passages 83a, 84a for the lower two rows of rollers 23, 24 or set to positions close to the center side. Owing to this structure, a pitch P between the right and left screw holes 33, 33 is narrowed whereby the screw holes can be formed to the position close to the lower side rollers 23, 24.

When a lifting load in a direction so as to lift the movable block 3 from the track rail 1 is applied, a force in a direction so as to detach the movable block 3 from the track rail 1 is applied while the above described screw holes 33, 33 are acting as points of application, in contrast, a reaction force against the force is applied to the roller rolling surfaces 73, 74 for the lower two rows of rollers 23, 24. The force applied to the screw hole 33 and the reaction force constitute a relation of a couple of forces, whereby a bending moment in a direction for spreading the supporting leg portions 5, 5 will occur.

In the case of this embodiment, the upper two rows of rollers 21, 22 are arranged to portions close to a center side portion, so that an interference of the upper two rows of the rollers 21, 22 with the screw hole 33 can be avoided. Simultaneously, the screw hole 33 is provided at a portion close to the lower side rollers 23, 24, so that a distance M in the horizontal direction between the screw hole 33 and the lower side rollers 23, 24 can be sufficiently shortened, whereby the bending moment in a direction for spreading the supporting leg portions 5, 5 can be reduced.

In addition, a relation between a lateral width W and a height A of the track rail 1 is set so as to satisfy A/W<1, so that stability of the track rail 1 can be enhanced, and simultaneously, an interference with an upper end opening portion 11a of a bolt inserting hole to be opened at a center of the upper surface of the track rail 1 can be avoided.

Furthermore, the lower two rows of rollers 23, 24 among the four rows of rollers 21–24 are arranged such that one row of rollers is disposed to right and left side surfaces of the track rail 1 respectively, while the roller rolling surfaces 63, 73; 64, 74 corresponding to the lower two rows of rollers 23, 24 are formed to the right and left side surfaces of the track rail 1 and inner side surfaces of the supporting leg portions 5, 5 of the movable block 3.

The upper two rows of rollers 21, 22 have a structure in which contact angle lines S1, S2 each constituted by a line orthogonal to a center axis of the upper two rows of rollers 21, 22 are inclined with respect to a vertical line V passing through a center between the rollers 21, 22 with predetermined inclination angles of α 1, α 2 so as to open in a direction towards an opposite side of the track rail 1. These contact angle lines S1, S2 are indicated as lines connecting centers in a width direction of the respective roller rolling surfaces 61, 71; 62, 72.

In this case, the positions of the roller returning passages 81a, 82a are located at outside the rollers 21, 22 in right and left directions, respectively. Therefore, at a time of formation of the screw holes 33, 33, it is required to take the interference with the roller returning passages 81a, 82a into consideration.

In a case shown in Figure, the positions of the roller returning passages 81a, 82a are located at almost upper portions of the rollers 23, 24, while the positions of the screw holes 33, 33 are located at almost upper portions of the roller returning passages 83a, 84a. When the positions of the upper side rollers 21, 22 and the roller returning passages 81a, 82a are shifted to portions further close to the center side, the positions of the screw holes 33, 33 can be shifted from the upper positions of the roller returning passages 83a, 84a to the center side, close to the upper positions of the lower side rollers 23, 24.

Figure 3:
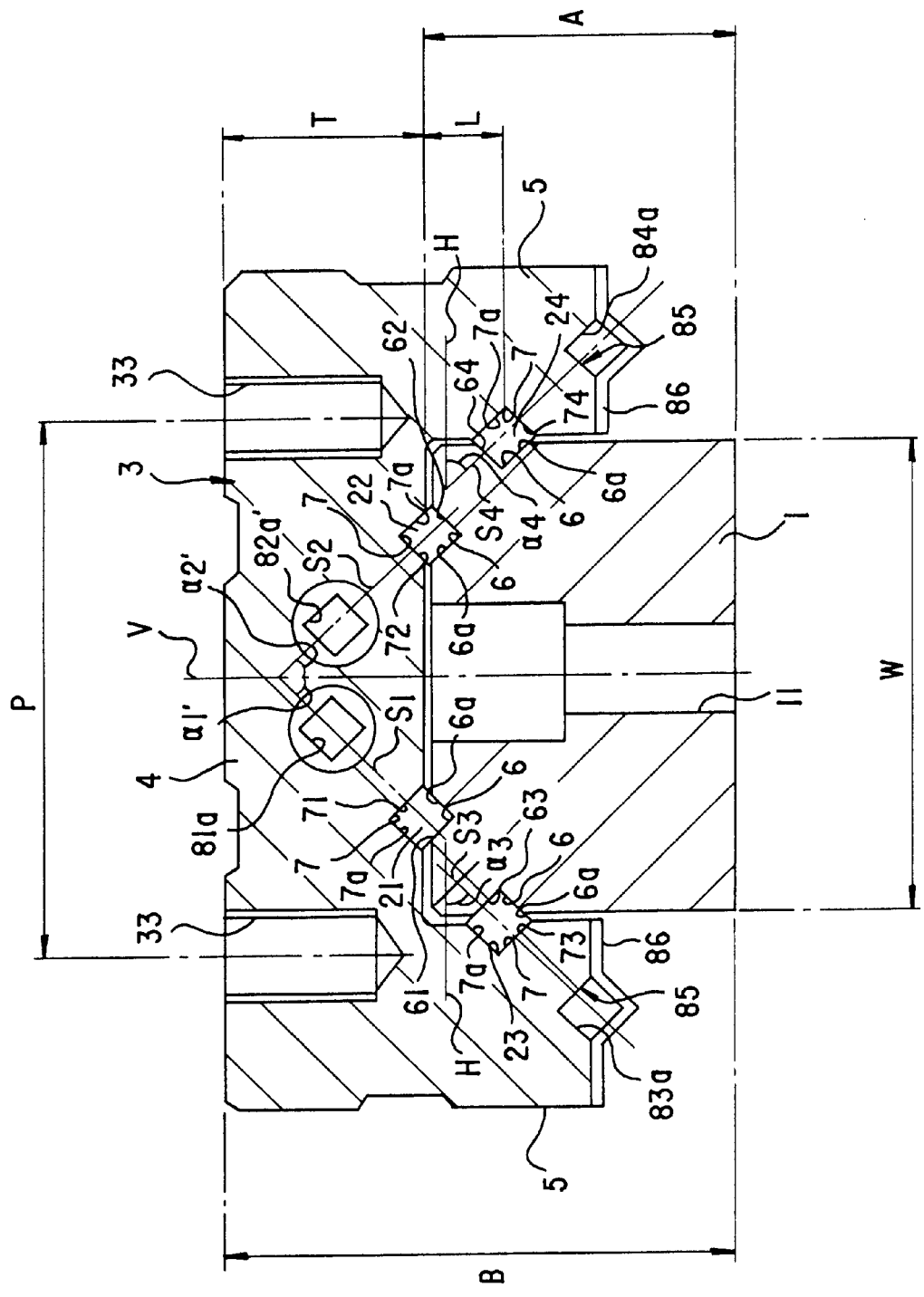
FIG. 3 is a view showing a modification of a roller contact structure for the upper two rows of the rollers used in the linear roller guide device shown in FIG. 1.

As to this contact structure, as shown in FIG. 3, there can be also proposed another structure in which the contact angle lines S1, S2 constituted by lines orthogonal to center axes of the upper two rows of rollers 21, 22 are inclined with respect to a vertical line V passing through a center of between the rollers 21, 22 with predetermined inclination angles of α1', α2' so as to close in a direction towards an opposite side of the track rail 1.

According to this structure, the positions of the roller returning passages 81a, 82a are shifted to the center side with respect to positions of the rollers 21, 22, so that it becomes unnecessary to take an interference of the screw holes 33, 33 with the roller returning passages 81a, 82a into consideration. Therefore, the positions of the screw holes 33, 33 can be set to portions close to the center side from the upper position of the roller returning passages 83a, 84a for the lower two rows of the rollers 23, 24 i.e., the screw holes 33, 33 can be set to almost the upper portions of the lower two rows of the rollers 23, 24.

On the other hand, the linear motion guide device has a structure in which the contact angle lines S3, S4 constituted by lines orthogonal to center axes of the lower two rows of rollers 23, 24 are inclined with respect to a horizontal line H passing through a center of between the rollers 21, 22 with predetermined inclination angles of α3, α4 so as to upwardly direct to the track rail 1 side. These contact angle lines S3, S4 are also indicated as lines connecting the centers in a width direction of the respective roller rolling surfaces 63, 73; 64, 74.

In particular, in this embodiment, the contact angles α1–α4 are set to almost 45°.

Further, in a case of the device shown in Figure, the roller returning passages 81a–84a are formed to be positioned on extended lines of the contact angle lines for respective rollers 21–24. According to this structure, the rolling directions of the rollers 21–24 coincide with the directions of the direction changing passages 81b–84b, so that the rollers 21–24 can be smoothly rolled and moved.

Figure 4:
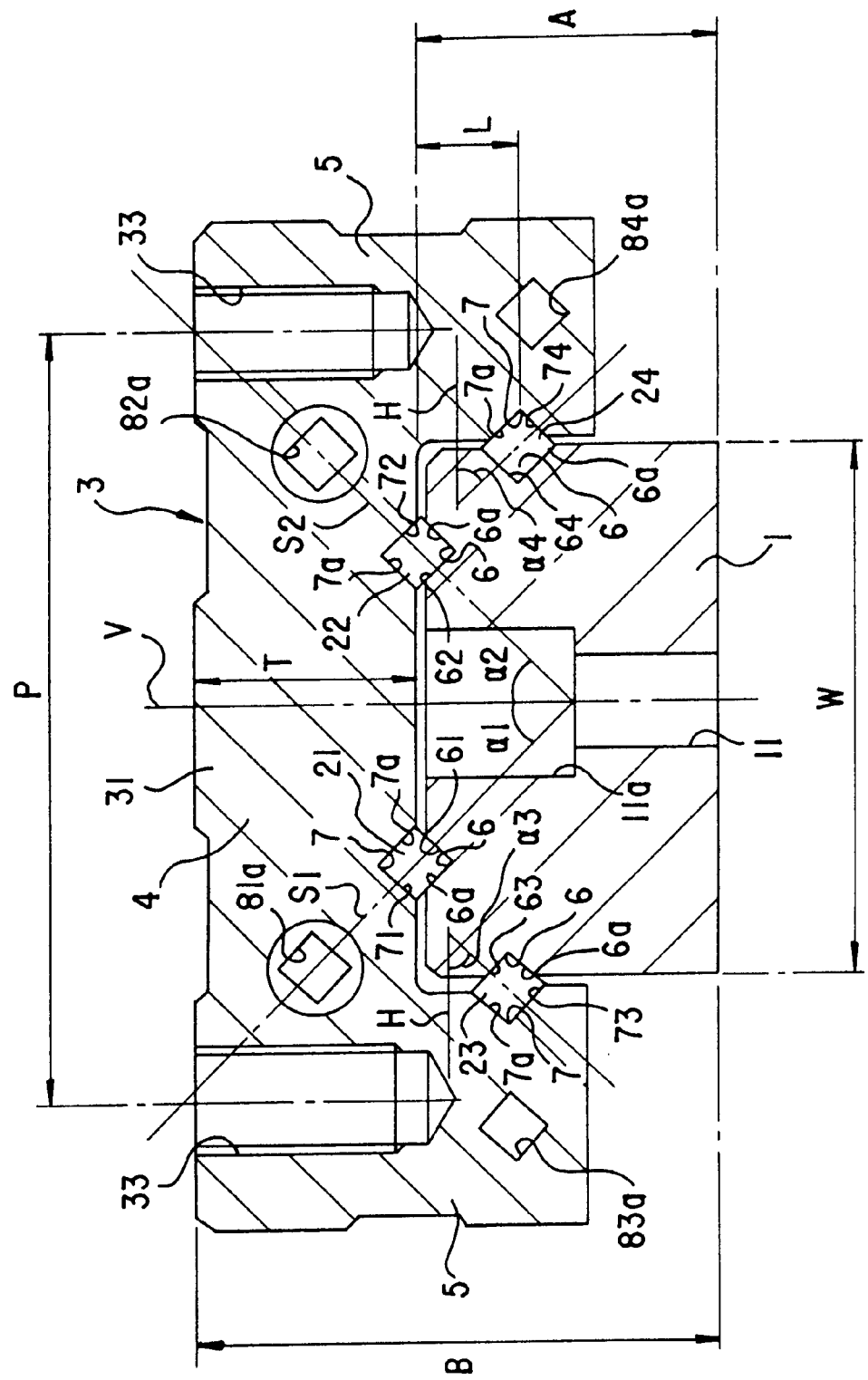
FIG. 4 is a view showing a modification of a roller returning passage for the lower two rows of the rollers used in the linear roller guide device shown in FIG. 1.

With respect to the roller returning passages 83a and 84a for the lower two rows of the rollers 23 and 24, as shown in FIG. 4, height positions of the passages 83a and 84a are set to almost the same as that of the roller rolling surface 73 in loaded region, so that a projecting length of each supporting leg portions 5, 5 can be shortened, whereby the height of the track rail 1 can be reduced. As a result, an entire height B of the device can be lowered, and thus realizing the stabilized state of the linear motion guide device.

Further, in the present invention, the track rail 1 having track grooves 6, 7 each having a V-shape in cross section comprising two inclined surfaces is used, and the roller rolling surfaces 61, 71; 62, 72; 63, 73; 64, 74 to be formed to the track rail 1 and the movable block 3 are formed to one of the inclined surfaces, while the other inclined surface is used as guide surfaces 6a, 7a for guiding the roller end surfaces.

According to the present invention, since the upper two rows of rollers 21, 22 are arranged so as to be shifted to a portion close to center side from the end portions of the upper surface of the track rail 1, it is sufficient to form one row of roller rolling surface 73 or 74 to each of the inner side surfaces of the supporting leg portions 5, 5 of the movable block 3. As a result, the lengths L from the base portion of the supporting leg portions 5, 5 to the lower side two rows of rollers 23, 24 can be shortened, so that even if a reaction force of the preload applied to the rollers 21–24 or an external load is applied, it becomes possible to decrease the bending moment to be applied to the supporting leg portions 5, 5.

Further, in general, due to the moment acting in a direction spreading the supporting leg portions 5 and 5, a center portion of the horizontal portion 4 will be bent so as to close to the upper surface of the track rail 1 However, in the present invention, a bending deformation of the horizontal portion 4 is suppressed by the action of the upper two rows of rollers 2 disposed between the horizontal portion 4 and the upper surface of the track rail 1, whereby the spreading of the supporting leg portions 5 and 5 can be sufficiently decreased synergistically in co-operation with the reduction of the bending moment.

As described above, even if the preload is applied by the two rows of the rollers 21, 22 disposed to the upper surface side of the track rail 1 or a lifting load is applied, the deformation in a direction so as to spread the supporting leg portions 5, 5 of the movable block 3 can be prevented and a degree of parallelization between the opposing roller rolling surfaces 61, 71; 62, 72; 63, 73; 64, 74 can be maintained to a constant level, whereby non-uniform contact of the rollers 21–24 can be prevented.

Further, when the angles between the contact angle lines S1, S2 of the upper two rows of rollers 21, 22 disposed on the upper surface of the track rail 1 and a vertical line V is set at almost 45°, or a state shown in FIG. 3, when the contact angle lines S1', S2' are set to be inclined with respect to the vertical line V with an inclination angle of almost 45° so as to open in a direction towards the track rail 1, and when the angles between the contact angle lines S3, S4 of the lower two rows of rollers 23, 24 disposed on the side surfaces of the track rail 1 with respect to a horizontal line H are set at almost 45°, the same rated loads can be obtained with respect to a radial load being applied from upper direction (i.e., a load in a direction so as to press the movable block 3 onto the track rail 1), lifting load and the lateral loads applied from right and left directions, whereby any of the load applied from every direction can be supported. In other words, the device can be used in any attitudes or positions, and available to wide applications.

Further, the roller rolling surfaces 61, 71; 62, 72; 63, 73; 64, 74 to be formed to the track rail 1 and the movable block 3 so as to correspond to the four rows of rollers 21–24 are formed to one of the inclined surfaces of the track grooves 6. 7 each having a V-shape in cross section while the other inclined surface is used as guide surfaces 6a, 7a for guiding the roller end surfaces. whereby the end surfaces of the rollers are guided while a pitch of the rollers is maintained to a predetermined value in a portion between the guide surfaces 6a, 7a of the track grooves 6, 7 formed to the track rail 1 side and the movable block 3 side which are opposed to each other.

As a result, a locating relation between the respective track grooves 6, 7 can be accurately measured by using a roller pin or the like, whereby the above locating relation between the respective track grooves 6, 7 can be formed or molded with high accuracy. Accordingly, the four rows of rollers 21–24 disposed between the track rail 1 and the movable block 3 can accurately contact to the roller rolling surfaces 61, 71; 62, 72; 63, 73; 64, 74 formed to a pair of track grooves 6, 7 corresponding to the four rows of rollers 21–24 disposed between the track rail 1 and the movable block 3, and the end surfaces of the roller are accurately guided by the action of the guide surfaces 6a, 7a of the paired track grooves 6, 7.

As described above, the movable block 3 has a rigidity regardless of the direction of the loads, so that the locating relation between the track rail 1 and the movable block 3 is normally maintained to a constant value. Further, the movable block 3 is supported by the track rail 1 at a position where the preload applied to the respective four rows of rollers 21–24 and the reaction force of the preload are balanced, so that a gap between the end surfaces of the rollers and the guide surfaces 6a, 7a can be normally maintained to a constant level in co-operation with the effect of accurately forming the locating relation between the respective track grooves 6, 7 as described above.

In particular, the movable block 3 is formed in a shape having a high rigidity, so that a high preload can be applied. Therefore, the high rigidity of the movable block 3 and the high preload are synergistically effected to realize an effect such that the gap between the end surfaces of the rollers 21–24 and the guide surfaces 6a, 7a can be maintained to a constant level. As a result, the skew preventing effect for the rollers 21–24 can be enhanced and a smooth circulation and a rolling accuracy of the rollers 21–24 can be secured.

Further, since the roller end surface guide member to be separately formed from the movable block 3 is not necessary in this invention, the thickness of the horizontal portion 31 of the movable block 3 can be increased with an amount equivalent to a space required for the roller end surface guide member, whereby the flexural rigidity of the horizontal portion 31 can be increased. In addition, by enhancing the rigidity of the movable block 3, the effect of preventing the skew generation can be further synergistically improved.

Since the roller rolling surfaces 61, 71; 62, 72 63, 73; 64, 74 and the guide surfaces 6a, 7a for guiding the end surfaces of the rollers are constituted by the track grooves 6, 7 having a V-shape in cross section, the roller rolling surfaces 61, 71; 62, 72; 63, 73; 64, 74 and the end surface guide surfaces 6a, 7a can be simultaneously finished by a grinding work, whereby a guiding accuracy and surface roughness of the roller rolling surfaces 61, 71; 62, 72; 63, 73; 64, 74 and the guide surfaces 6a, 7a for guiding the end surfaces of the rollers are improved and a remarkable effect in skew prevention can be obtained. In addition, the working amount for the track grooves can be minimized.

As described above, according to the present invention, since the upper two rows of rollers are arranged to be shifted to portions close to center side apart from the end portions of the upper surface of the track rail and the lower two rows of the rollers are arranged to be shifted to upper portions of the right and left side surfaces of the track rail, the lengths from the base portions of the right and left supporting leg portions of the movable block to the lower side rollers can be shortened in comparison with a conventional case where the two rows of rollers are arranged to the right and left sides surfaces of the track rail, respectively.

Accordingly, even if a reaction force of the preload applied to the roller or a lateral load acting in a direction so as to displace the movable block in a horizontal direction with respect to the track rail is applied, it becomes possible to decrease the bending moment acting in a direction spreading the supporting leg portions.

Further, in general, due to the moment acting in a direction spreading the supporting leg portions, a center portion of the horizontal portion is bent so as to close to the upper surface of the track rail. However, in the present invention, such bending deformation of the horizontal portion is suppressed by the action of the upper two rows of rollers disposed between the horizontal portion and the upper surface of the track rail, whereby the spreading of the supporting leg portions can be sufficiently decreased in co-operation with the reduction of the bending moment.

As described above, even if the preload is applied to the roller or a lateral load in a horizontal direction is applied, the deformation in a direction spreading the supporting leg portions of the movable block can be prevented and a degree of parallelization between the opposing roller rolling surfaces can be maintained to a constant level, whereby non-uniform contact of the rollers can be prevented.

When a screw hole for fixing the movable block is provided at portions on the upper surface of right and left end portions of the horizontal portion of the movable block, and the portions are set to upper positions of the roller circulating passages in unloaded region for the lower two rows of rollers or set to portions close to the center side, whereby an interference of the upper two rows of the rollers with the roller circulating passages can be avoided and the length in the horizontal direction between the screw hole and the lower side rollers is sufficiently shortened, so that it becomes possible to decrease the bending moment acting in a direction so as to spread the supporting leg portions due to the lifting load.

According to the structure described above, not only in a case when the preload is applied to the roller or the lateral load is applied but also in a case when the lifting load is applied, the moment can be also decreased, the deformation in a direction spreading the supporting leg portions of the movable block can be prevented, and the degree of parallelization between the roller rolling surfaces is maintained to a constant level whereby the non-uniformity in contacting of the rollers can be prevented.

Further, when an angle between a line orthogonal to the rotation axis of the upper two rows of rollers disposed on the upper surface of the track rail and a vertical line is set at almost 45° and an angle between a line orthogonal to the rotation axis of the lower two rows of rollers disposed on the side surfaces of the track rail and a horizontal line is set at almost 45° the same rated load can be obtained with respect to a radial load being applied from the upper direction (i.e., a load in a direction so as to press the movable block onto the track rail), the lifting load and the lateral loads applied from right and left directions, whereby any of the load applied from every direction can be supported. In other words, the device can be used in any attitudes or positions, and available to wide applications.

Further, when a structure in which a track rail having a track groove having a V-shaped in cross section comprising two inclined surfaces is used and the roller rolling surfaces to be formed to the track rail and the movable block so as to correspond to the four rows of rollers are formed to one of the inclined surfaces while the other inclined surface is used as a guide surface for guiding the roller end surface whereby the end surfaces of the rollers are guided while a pitch of the rollers is maintained to a predetermined value in a portion between the guide surface of the track groove of the track rail side and the guide surface of the movable block side which are opposed to each other, a locating relation between the respective track grooves can be accurately measured by using a roller pin or the like. On this premise, the locating relation between the respective track grooves can be molded or formed with high accuracy. Accordingly, the contacting state between the rollers and the roller rolling surfaces as well as the gap between the roller end surface and the guide surface can be maintained with a higher accuracy.

As described above, the movable block has a rigidity regardless of the direction of the loads, so that the locating relation between the track rail and the movable block is normally maintained to a constant value. Further, the movable block is supported by the track rail at a position where the preload applied to the respective four rows of rollers and the reaction force of the preload are balanced, so that a gap between the end surface of the roller and the guide surface can be normally maintained to a constant level in co-operation with the effect of accurately working the locating relation of the respective track grooves as described above.

Accordingly, the four rows of rollers disposed between the track rail and the movable block accurately contact to the roller rolling surfaces formed to a pair of track grooves corresponding to the four rows of rollers. and the end surfaces of the roller are accurately guided by the action of the guide surfaces formed to the paired track grooves.

In particular, the movable block is formed in a shape having a high rigidity, so that a high preload can be applied. Therefore, the high rigidity of the movable block and the high preload are synergistically effected to realize an effect such that the gap between the end surface of the roller and the guide surface can be maintained to a constant level. As a result, the skew preventing effect for the rollers can be enhanced and a smooth circulation and a rolling accuracy of the rollers can be secured.

Further, the space for installing the roller end surface guide member, which is conventionally required to be provided to the lower surface of the movable block, becomes unnecessary in this invention, so that the thickness of the horizontal portion of the movable block can be increased with an amount equivalent to the space, whereby the flexural rigidity of the horizontal portion can be increased and also the rigidity of the movable block can be enhanced. In addition, by enhancing the rigidity of the movable block, the effect of preventing the skew generation can be further synergistically improved.

Further, since the roller rolling surfaces and the guide surfaces for guiding the roller end surfaces are constituted by the track groove having a V-shape in cross section, the roller rolling surfaces and the guide surfaces for guiding roller end surface can be simultaneously finished by a grinding work, so that the roller rolling surfaces and the guide surfaces for guiding roller end surfaces can be easily worked. In addition, a guiding accuracy of the rollers and surface roughness are also improved and a high effect in skew prevention can be obtained. In addition, the working amount for the track groove can be minimized.

Further, since a retainer for the roller is eliminated and the roller contacts to the roller rolling surface at an entire length of the roller, the rigidity of the roller per se can be effectively utilized. [Another Embodiment]

Figure 5A:
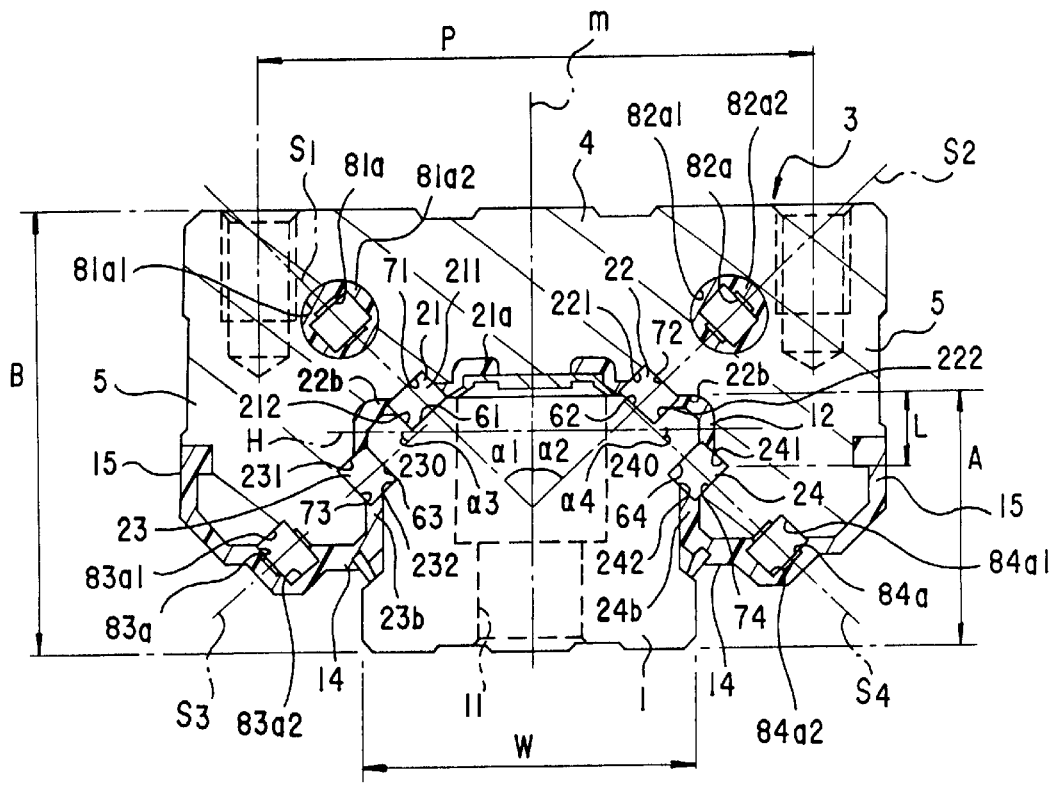
FIG. 5(a) is a longitudinal sectional view and FIG. 5(b) is an enlarged view of a portion close to the rollers disposed at an upper surface and a side surface.
Figure 5B:
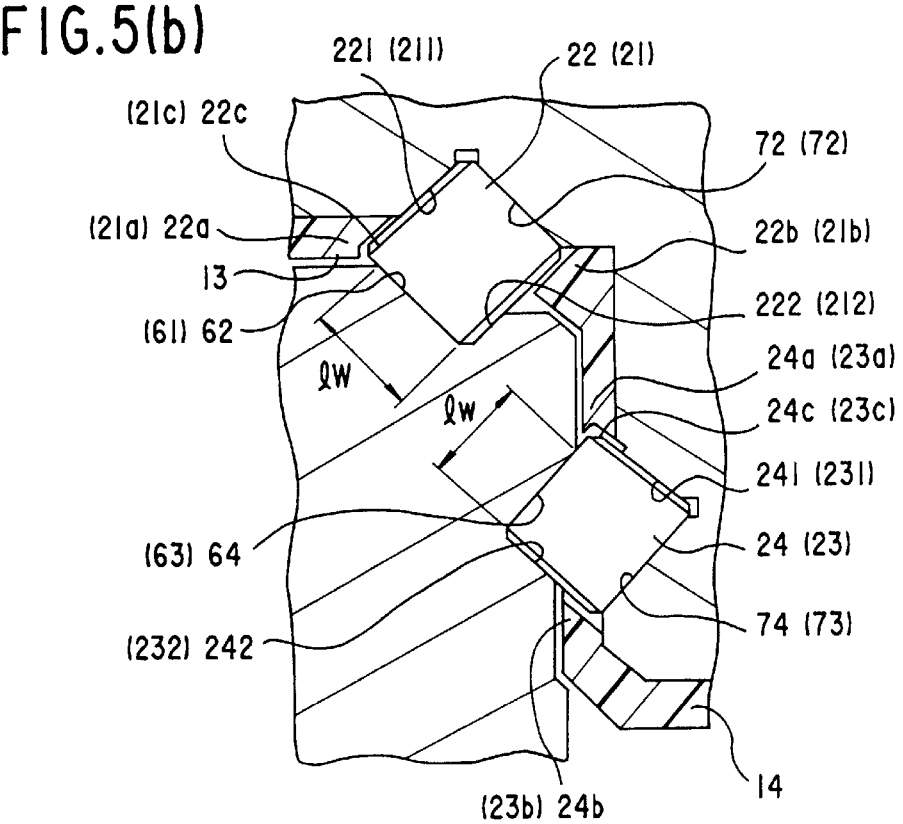
Figure 6:
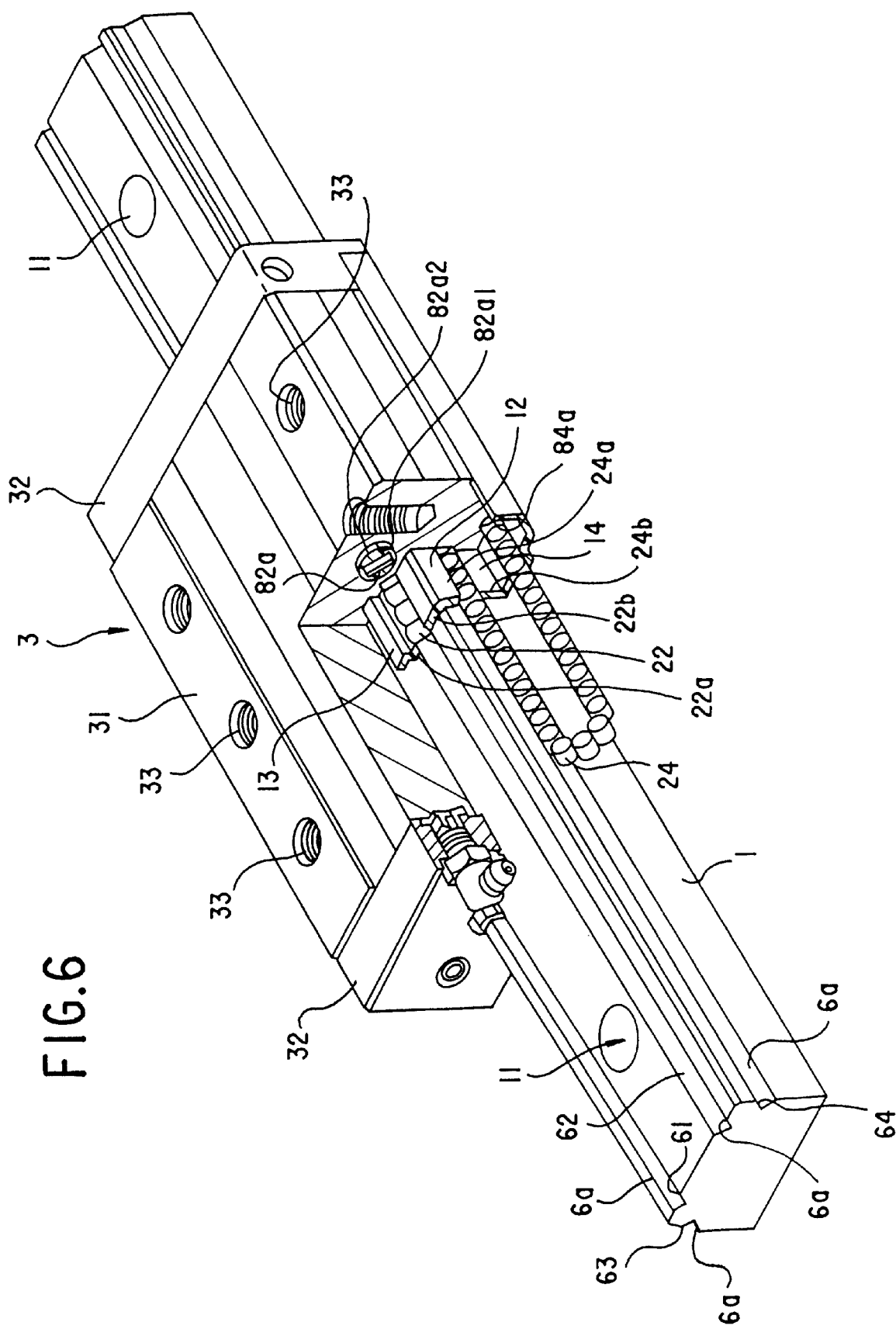
FIG. 6 is a perspective view partially in section of the linear roller guide device shown in FIG. 5.
Figure 7A:
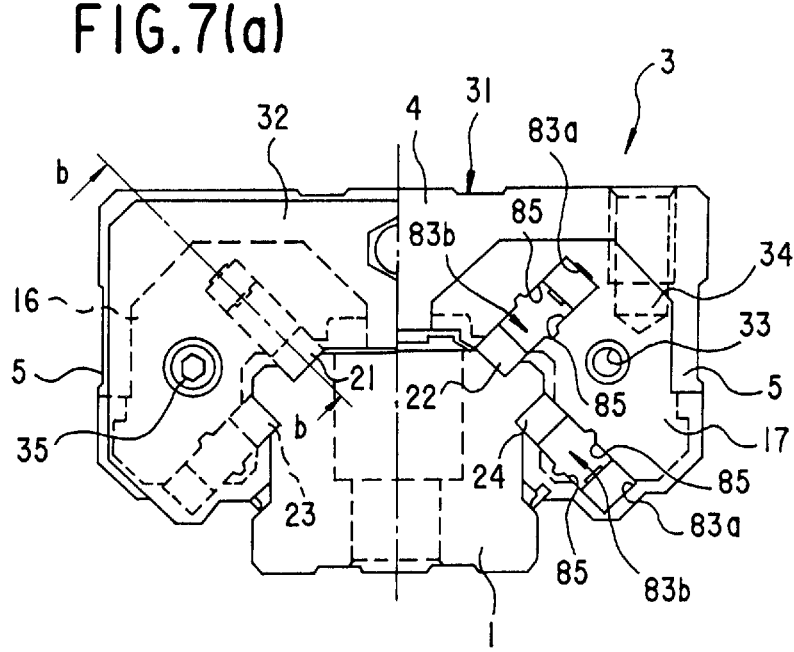
FIG. 7(a) is a view showing a structure of an end portion of the movable block used in the linear roller guide device shown in FIG. 1.
Figure 7B:
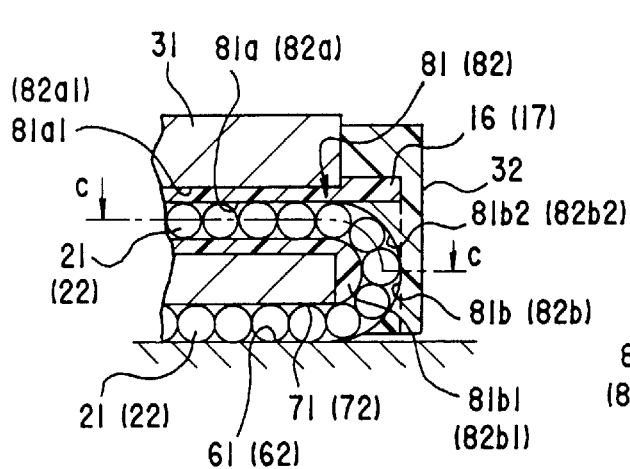
FIG. 7(b) is a view partially in section showing a structure of a roller circulating passage for upper surface side roller.
Figure 7C:
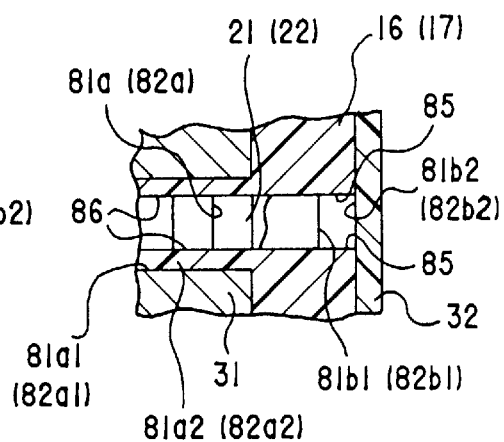
FIG. 7(c) is a cross sectional view taken along the line c—c of FIG. 7(b).
Figure 7D:
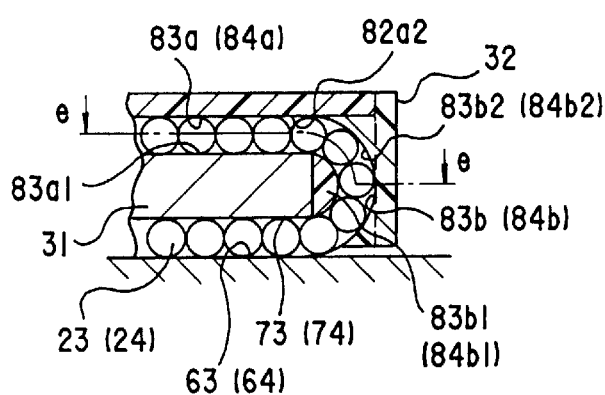
FIG. 7(d) is a view partially in section showing a structure of a roller circulating passage for side surface side roller.
Figure 7E:
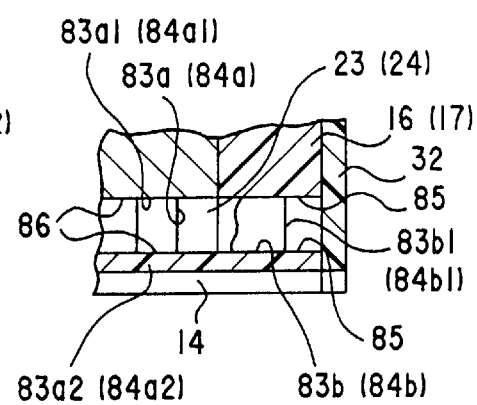
FIG. 7(e) is a cross sectional view taken along the line e—e of FIG. 7(d).

FIGS. 5 to 7 are views showing another embodiment of a linear roller guide device according to the present invention. Namely, the linear roller guide device of this embodiment has also a structure in which a number of rollers 21–24 are arranged in a form of four rows of rollers in total of which two rows of rollers are disposed on an upper surface of a track rail 1 and one row of rollers are disposed to right and left side surfaces of the track rail 1, respectively, and a movable block 3 is guided along a track rail 1 through the upper surface side rollers 21, 22 and the side surface side rollers 23, 24.

The movable block 3 comprises a horizontal portion 4 opposing to an upper surface of the track rail 1, and supporting leg portions 5, 5 extending downwardly from both end portions of the horizontal portion 4 so as to oppose to right and left side surfaces of the track rail 1.

The track rail 1 has a rectangular shape in section, an upper surface of the track rail is formed with two rows of roller rolling surfaces while each of right and left side surfaces of the track rail is formed with one row of roller rolling surface, respectively, i.e., totally four rows of the roller rolling surfaces 61–64 are formed to the track rail 1 over entire length of the track rail 1. Further, the track rail 1 is formed with a plurality of bolt insertion holes 11 for fixing the track rail in a longitudinal direction, and an upper opening portion of each bolt insertion holes 11 is formed at a center of the upper surface of the track rail 1.

On the other hand, the movable block 3 is provided with four rows of roller rolling surfaces 71–74 for rollingly clamping the four rows of rollers 21–24 so as to oppose to the roller rolling surfaces 61–64 of the track rail 1. The movable block 3 is also provided with four rows of roller circulating passages 81–84 at unloaded region for circulating both the upper surface side and side surface side rollers 21–24 clamped between the roller rolling surfaces 61, 71; 62, 72; 63, 73; 64, 74 of the track rail 1 and the movable block 3 from one end to the other end of the roller rolling surfaces 71–74 of the movable block 3.

As shown in FIGS. 6 and 7, the movable block 3 comprises a block body 31 and side covers 32, 32 to be attached to both end surfaces in an axial direction of the block body 31. The roller rolling surfaces 71–74 are formed to the block body 31. The roller circulating passages 81–84 comprises roller returning passages 81a–84a formed to the block body 31 so as to be in parallel to each of the roller rolling surfaces 71–74 and direction changing passages 81b–84b having an U-shape a part of which is constituted by the side covers 32, 32.

As shown in FIG. 5, the two rows of the upper surface side rollers 21, 22 disposed to the upper surface of the track rail 1 has a contact structure in which contact angle lines S1 and S2 constituted by lines orthogonal to the rolling axes of the rollers 21, 22 are inclined with respect to a center longitudinal axial line (vertical line) V, which equally divides the track rail 1 into right and left portions, with a predetermined inclination angle of α 1 so as to open upwardly. These contact angle lines S1, S2 are indicated as lines connecting centers in a width direction of the respective roller rolling surfaces 61, 71; 62, 72.

In addition, the surface side rollers 23, 24 disposed to the right and left side surfaces of the track rail 1 has a contact structure in which contact angle lines S3 and S4 constituted by lines orthogonal to the rolling axes of the rollers 23, 24 are inclined with respect to the above vertical line m with a predetermined inclination angle of α2 so as to open downwardly. These contact angle lines S3, S4 are also indicated as lines connecting centers in a width direction of the respective roller rolling surfaces 63, 73; 64, 74.

In particular, in this embodiment, each of the contact angles α 1–α°4 is set to almost 45°. Further, in case of the device shown in Figure, the roller returning passages 81a–84a are formed to be positioned on extended lines of the contact angle lines for respective upper surface side and side surface side rollers 21–24. According to this structure, the rolling directions of the upper surface side and side surface side rollers 21–24 coincide with the directions of the direction changing passages 81b–84b, so that the upper surface side and side surface side rollers 21–24 can be smoothly rolled and moved.

The two rows of the roller rolling surfaces 71, 72 to be formed to the lower surface of the horizontal portion 4 opposing to the roller rolling surfaces 61, 62 formed to the upper surface of the track rail 1 and the roller rolling surfaces 73, 74 to be formed to the inner side surfaces of the right and left supporting leg portions 5, 5 opposing to the roller rolling surfaces 63, 64 formed to the right and left side surfaces of the track rail 1 are formed so as to be laterally symmetric with respect to the center longitudinal axial line (vertical line) V passing through the center of the track rail 1.

As shown in FIG. 5(b) in detail, upper surface side roller first end surface guide portions 211, 221 for guiding one end surface at a side (inner side) of the center longitudinal axial line (vertical line) V of the upper surface side rollers 21, 22 are provided to one side periphery at a side the center longitudinal line (vertical line) V of the roller rolling surfaces 71, 72 to be formed to the lower surface of the horizontal portion 4 of the movable block 3 so as to rise up at an almost right angle with respect to the roller rolling surfaces 71 and 72, while upper surface side second end surface guide portions 212, 222 for guiding the other end surface of the upper surface side rollers 21, 22 are provided to the other side (outer side) periphery at an opposing side with respect to the center longitudinal line (vertical line) V of the roller rolling surfaces 61, 62 formed to the track rail 1 so as to rise up at an almost right angle with respect to the roller rolling surfaces 61, 62.

The upper surface side roller first end surface guide portions 211, 221 are constituted by a member per se constituting the block body 31, while the upper surface side second end surface guide portions 212, 222 are constituted by the block body 31 per se.

In this embodiment, the roller rolling surfaces 61, 71; 62, 72 to be formed to the upper surface of the track rail 1 and the lower surface of the horizontal portion 4 of the movable block 3 are constituted by one inclined surface of the grooves each having a V-shape in cross section comprising two inclined surfaces, while the other inclined surface is used as both the upper and side surface sides first and second end surface guide portions 211, 221;231, 241 for guiding both end surfaces of the upper surface side rollers 21, 22.

Each of the upper and side surface side first end surface guide portions 211, 221;231, 241 almost has a width equivalent to a diameter of each upper and side surface sides rollers 21 and 22, while each of the upper surface side second end surface guide portions 212, 222 almost has a width equivalent to a radius of each upper surface side rollers 21 and 22.

Further, radial direction retaining portions 21a, 22a each having a projection for preventing the upper surface side rollers 21, 22 from falling out in a radial direction by being engaged with peripheral corner portions of the upper surface side rollers 21, 22 when the movable block 3 is detached from the track rail 1, are provided to one side periphery of the roller rolling surfaces 71, 72 formed to the lower surface of the horizontal portion 4, the periphery being a position of a track rail 1 side which is shifted from the upper surface side roller first end surface guide portions 211, 221 with respect to the roller rolling surfaces 71 and 72.

The radial direction retaining portions 21a, 22a are composed of resin moldings, and fixed through adhesion to the lower surface of the horizontal portion 4 so as to have a predetermined thickness. The projections 13, 13 are projected from a lower end portion of the roller end surface almost with a right angle so as to cover the peripheral corner portions 21c, 22c of the upper surface side rollers 21 and 22. A projecting width is suppressed to a minimum degree to prevent the upper surface side rollers 21 and 22 from falling out.

In this embodiment, a length of each of the upper surface side rollers 21, 22 is slightly longer than a width of the roller rolling surfaces 61 and 62 formed to the track rail 1. The end portions of the upper surface side rollers 21, 22 are slightly projected from upper side periphery of the roller rolling surfaces 61 and 62. The projections 13, 13 of the radial direction retaining portions 21a, 22a are engaged with the projected periphery portions of the roller end surfaces.

The upper surface side rollers 21, 22 contact to the roller rolling surfaces 61, 62 at an almost entire length thereof except an engaging width (which is equivalent to a width projecting from the side periphery of the roller rolling surfaces 61 and 62) which engages with the projections 13, 13 formed to the radial direction retaining portions 21a and 22a, whereby an effective contact length 1w is secured to have a sufficiently long length.

On the other hand, axial direction retaining portions 21b, 22b for preventing the roller from falling out in an axial direction by opposing to the other end surface of the upper surface side rollers 21, 22 are provided to a side periphery of the roller rolling surfaces 71, 72 formed to the movable block 3, the side periphery being opposite to the side periphery to which the first end surface guide portions 211 and 212 are provided.

The axial direction retaining portions 21b, 22b are provided to the other side peripheries of the roller rolling surfaces 71, 72 formed to the block body 31 and are opposing to the end surface portion of the upper surface side rollers 21, 22 which are not guided by the upper surface side roller second end surface guide portions 212, 222 formed to the side periphery of the roller rolling surfaces 61, 62 formed to the track rail 1, so as to have a small gap therebetween.

The axial direction retaining portions 21b, 22b are also composed of resin moldings and fixed through adhesion to both right and left end portions of the lower surface of the horizontal portion 4 so as to have a predetermined thickness.

The roller rolling surfaces 73, 74 to be formed to the inner side surfaces of the supporting leg portions 5, 5 so as to oppose to the roller rolling surfaces 63, 64 formed to right and left side surfaces of the track rail 1 are also formed so as to be laterally symmetric with respect to the center longitudinal axial line (vertical line) V.

Side surface side roller first end surface guide portions 231, 241 for guiding upper end surface of the upper surface side rollers 23, 24 are provided to an upper periphery of the roller rolling surfaces 73, 74 so as to rise up at an almost right angle with respect to the roller rolling surfaces 73 and 74, while side surface side second end surface guide portions 232, 242 for guiding the lower end surface of the side surface side rollers 23, 24 are provided to an lower side periphery of the roller rolling surfaces 63, 64 formed to the track rail 1 so as to rise up at an almost right angle with respect to the roller rolling surfaces 63 and 64.

The side surface side roller first end surface guide portions 231, 241 are constituted by a member per se constituting the block body 31, while the side surface side second end surface guide portions 232, 242 are constituted by the block body 31 per se.

The roller rolling surfaces 63, 73; 64, 74 to be formed to the right and left side surfaces of the track rail 1 and the inner side surfaces of the right and left supporting leg portions 5, 5 of the movable block 3 are constituted by one inclined surface of the grooves each having a V-shape in cross section comprising two inclined surfaces which open in a side direction, while the other inclined surface is used as both the side surface side first and second end surface guide portions 231, 241; 232, 242 for guiding both end surfaces of the side surface side rollers 23, 24.

Each of the side surface side roller first end surface guide portions 231, 241 almost has a width equivalent to a diameter of each side surface side rollers 23 and 24, while each of the side surface side second end surface guide portions 232, 242 almost has a width equivalent to a radius of each side surface side rollers 23 and 24.

Further, radial direction retaining portions 23a, 24a, each having projections 13, 13 for preventing the side surface side rollers 23, 24 from falling out in a radial direction by being engaged with peripheral corner portions of the end surfaces of the side surface side rollers 23, 24 when the movable block 3 is detached from the track rail 1, are provided to upper slide periphery of the roller rolling surfaces 73 and 74, the periphery being a position of a track rail 1 side which is shifted from the side surface side roller first end surface guide portions 232, 242 with respect to the roller rolling surfaces 73 and 74.

The radial direction retaining portions 23a, 24a are also composed of resin moldings and integrally bonded to the inner side surfaces of the supporting leg portions 5, 5 of the movable block 3 so as to have a predetermined thickness. Upper end portions of the radial direction retaining portions 23a, 24a are formed to be continuous to the axial direction retaining portions 21b, 22b of the upper surface side rollers 21 and 22.

In this embodiment, a length of each of the upper surface side rollers 21, 22 is slightly longer than a width of the roller rolling surfaces 63 and 64 formed to the track rail 1. The end portions of the side surface side rollers 23, 24 are slightly projected from upper side periphery of the roller rolling surfaces 63 and 64. The projections 13, 13 of the radial direction retaining portions 23a, 24a are engaged with the projected periphery portions of the end surfaces of the side surface side rollers 23 and 24.

The side surface side rollers 23, 24 contact to the roller rolling surfaces 63, 64 at an almost entire length thereof except an engaging width (which is equivalent to a width projecting from the side periphery of the roller rolling surfaces 63 and 64) which engages with the projections 13, 13 formed to the radial direction retaining portions 23a and 24a.

On the other hand, axial direction retaining portions 23b, 24b for preventing the roller from falling out in an axial direction by opposing to the other end surface of the side surface side rollers 23, 24 are provided to a lower side periphery of the roller rolling surfaces 73, 74 formed to the movable block 3, the side periphery being opposite to the side periphery to which the first end surface guide portions 231 and 242 are provided.

The axial direction retaining portions 23b, 24b are also composed of resin moldings and fixed through adhesion to a portion lower than the roller rolling surface 74 formed to the inner side surfaces of the supporting leg portions 5 and 5.

The upper surface side roller returning passages 81a, 82a for the upper surface side two rows of rollers 21, 22 are constituted by upper surface side roller returning passage resin portions 81a2 and 82a2 as the roller returning passage forming material which fills large-sized penetration bores 81a1 and 82a1 penetratingly formed to the block body 31. Each of the upper surface side roller returning passage resin portions 81a2 and 82a2 are formed to have a rectangular shape in cross section which correspond to a cross-sectional shape of the upper surface side rollers 21 and 22.

The side surface side roller returning passages 83a, 84a for the side surface side rollers 23, 24 are constituted by a V-shaped groove 83a1 provided to the supporting leg portions 5, 5 of the block body 31 so as to open downwardly and by a side surface side roller returning passage resin portion 14 to be adhesively and integrally fixed to the lower end surface of the supporting leg portions 5 and 5, the side surface side roller returning passage resin portion 14 having a V-shaped groove 83a2 which is provided so as to correspond to the V-shaped groove 83a1 and to open upwardly.

The side surface side roller returning passage resin portion 14 covers an entire lower surface of the supporting leg portions, and is integrally formed to be continuous to the axial direction retaining portions 23b, 24b of the side surface side rollers 23 and 24, inner side end portions of the axial direction retaining portions 23b, 24b being adhesively fixed to the inner side surfaces of the supporting leg portions 5 and 5. Further, an outer end of the side surface side roller returning passage resin portion 14 is integrally formed so as to be continuous to an outer resin portion 15 for covering lower portions of outer side surfaces of the lovable block 3.

Further, at the end surface of the movable block 31 is provided with end surface resin portions 16 and 17 to which the direction changing passage inner periphery portions 81b1 –84b1 of the direction changing passages 81b–84b for the upper surface side rollers 21, 22 and the side surface side rollers 23, 24 are formed so that the end surface resin portions 16 and 17 are independently provided at right and left sides with respect to the center longitudinal axial line, respectively.

In addition, these end surface resin portions 16 and 17, the upper surface side roller returning passage resin portions 81a2 and 82a2, the radial direction retaining portions 21a, 22a and the axial direction retaining portions 21b, 22b for the upper surface side rollers 21 and 22, the radial direction retaining portions 23a, 24a and the axial direction retaining portions 23b, 24b for the side surface side rollers 23 and 24, the side surface side roller returning passage resin portion 14 and the supporting leg portion outer side surface resin portion 15 are integrally formed with the block body 31 by inserting the block body 31 into a molding die.

These end surface resin portions 16. 17 are provided with a boss portion 34 corresponding to a tapped hole 33 so as to open the tapped hole 33 for fastening the side cover 32 attached to the end surface of the block body 31.

The movable block of the linear roller guide device of this invention is manufactured in accordance with the following processes.

The movable block 31 is previously formed with the roller rolling surfaces 71–74. Then, as shown in FIG. 8, the movable block 31 is subjected to an insert molding in which the end surface resin portions 16 and 17, the upper surface side roller returning passage resin portions 81a2 and 82a2, the radial direction retaining portions 21a, 22a and the axial direction retaining portions 21b, 22b for the upper rollers 21 and 22, the radial direction retaining portions 23a, 24a for the side surface side rollers 23 and 24, the axial direction retaining portions 23b, 24b for the side surface side rollers 23 and 24, the side surface side roller returning passage resin portions 14, 14 and the outer side surface resin portion 15, are integrally formed with the block body 31 by inserting the block body 31 into the molding die.

FIG. 8 is a schematic view showing a structure of the molding die in which cavities 5a for forming the upper surface side roller returning passage resin portions 81a2 and 82a2 are provided to the block body 31, cavities 5b for forming the end surface resin portions 16 and 17 each having the direction changing passage inner peripheral portion are provided to both front and rear end portions of the supporting leg portion 5, cavities 5c for forming the axial direction retaining portions 21b, 22b for the upper rollers 21, 22 and the radial direction retaining portions 23a, 24a for the side surface side rollers 23 and 24 are provided to a corner portion between the supporting leg portion 5 and the horizontal portion 4, cavities 5d for forming the radial direction retaining portions 21a, 22a for the upper surface side rollers 21 and 22 are provided to the lower surface of the horizontal portion 4, and cavities 5e for forming the axial direction retaining portions 23b, 24b for the side surface side rollers 23 and 24, the side surface side roller returning passage resin portion 14 and the outer side surface resin portion 15 are provided to a circumference from the lower end surface to both inner and outer side surfaces of the supporting leg portion 5, respectively.

In addition, a fixed molding die 50 is provided with convex portions 52 for positioning by engaging the roller rolling surfaces 71–74 with the convex portions 52, while a movable molding die 51 is provided with pins 53 for forming unloaded roller returning holes 81a1–84a1.

At the time of the insert molding, as shown in FIG. 8(a), the movable block 31 is positioned on the basis of the roller rolling surfaces 71–74. As described above, the positions of the unloaded roller returning passages 81a–84a and both radial and axial direction roller retaining portions 21a–24a; 21b–24b are determined on the basis of the roller rolling surfaces 71–74, so that it is possible to accurately set the relatively positional relations between the roller rolling surfaces 71–74, the direction changing passages 81b–84b and the unloaded roller returning passages 81a–84a which constitute roller circulating passages.

Further, at the time of positioning the block body 31 within the fixed molding die, when the block body 31 is positioned on the basis of the roller rolling surfaces 71–74, the contact portions of the block body 31 are limited and minimized to the roller rolling surfaces 71–74, while the other portions of the fixed molding die 50 can be maintained in a non-contacted state, so that it becomes unnecessary to accurately work the fixed molding die 50 and a manufacturing of the fixed molding die 50 can be simplified.

In this embodiment, gaps are formed between the fixed molding die 50 and the block body in a range from the upper surface of the horizontal portion of the block body 31 to the upper end portion of the outer side surfaces of the supporting leg portion lower resin portion formed to the outer side surfaces of the supporting leg portions. The block body 31 contacts to inner peripheral surfaces of the fixed molding die at an upper end portion of the cavities 5e in a contacting state enabling to seal resin material. A contacting state where a small gap is formed may be allowed as far as the resin material can be sealed.

Further, the direction changing passage inner periphery portions 81b1–84b4 together with the unloaded roller returning passages 81a–84a are integrally formed with the block body 31 by utilizing the insert molding method.

According to this process, as well as the upper surface side roller returning passage resin portions 81a2–84a2 and the end surface resin portions 16 and 17, the radial direction roller retaining portions 21a, 22a and the axial direction roller retaining portions 21b, 22b for the upper surface side rollers 21 and 22, the radial direction roller retaining portions 23a, 24a for the side surface side rollers 23, 24 and the axial direction roller retaining portions 23b, 24b for the side surface side rollers 23 and 24, the side surface side roller returning passage resin portions 14, 14 and the outer side surface resin portions 15 are also integrally formed with the block body 31 by utilizing the insert molding method.

Thereafter, a side cover 32 is assembled to both end portions of the block body 31 to thereby complete the direction changing passages.

According to the present invention, one end surface of the upper surface side and the side surface side rollers 21–24 is guided by the first end surface guide portions 211, 221, 231 241 provided to one side periphery portions of the roller rolling surfaces 71–74 formed to the movable block 3, while the other end surface of the upper surface side and the side surface side rollers 21–24 is guided by the second end surface guide portions 212, 222, 232, 242 provided to the other side periphery portions of the roller rolling surfaces 61–64 formed to the track rail 1.

Further, when the movable block 3 is detached from the track rail 1, the second end surface guide portions 212, 222, 232, 242 provided to the track rail 1 are also detached from the other end surfaces of the upper surface side and side surface side rollers 21–24. However, the upper surface side and side surface side rollers 21–24 are retained between the first end surface guide portions 211, 221, 231, 241 provided to one side of the roller rolling surfaces 71–74 formed to the movable block 3 and the axial direction retaining portions 21b, 22b, 23b, 24b provided to the other side periphery portions thereof.

Further, the peripheral portions 21c–24c of the one end surface of the upper surface side and side surface side rollers 21–24 are retained by the upper surface side and side surface side roller radial direction retaining portions 21a, 22a;23a, 24a provided to the first end surface guide portions 211, 221, 231 and 241, so that the falling-out of the rollers in a radial direction can be prevented.

As described above, the radial direction retaining portions 21a–24a for the both upper surface side and side surface side rollers are engaged with only periphery portions of the one end surface of the rollers 21–24, and the second end surface guide portions 212–242 are provided to the other side periphery portions of the roller rolling surfaces 71–74 formed to the track rail 1, so that a peripheral surface of each rollers 21–24 except the engaging portion for engaging with the radial direction retaining portions 21a–24a can be contacted to the roller rolling surfaces 61–64 formed to the track rail 1 so that the end surface is closely contacted to the second end surface guide portions 212–242, whereby the effective contact length of the rollers 21–24 can be sufficiently secured in a long length. Accordingly, the high rigidity characteristics of the rollers 21–24 can be sufficiently utilized.

Further, since the second end surface guide portions 212–242 are provided to a side of the roller rolling surfaces 61–64 of the track rail 1, the second end surface guide portions 212–242 can be worked with a high accuracy, whereby the skew generation at the rollers 21–24 can be further securely prevented.

In addition, since the first end surface guide portions 211–241 are constituted by the member for constituting the block body 31 of the movable block 3, the first end surface guide portions 211–241 can be worked so as to have a high rigidity and high accuracy, and the end surfaces of the rollers are guided at portions between the first end surface guide portions and the second end surface guide portions 212–242 provided to the track rail 1 also having a high rigidity, whereby the skew generation can be further securely prevented.

Further, since both the radial and axial direction retaining portions 21a–24a; 221b–24b are integrally formed with the block body 31 by inserting the block body 31 into the molding die, both the radial and axial direction retaining portions 21a–24a; 21b–24b can be accurately positioned without causing any attaching error. so that a predetermined small gap between the upper surface side and side surface side rollers 21–24 and the radial direction retaining portions and the axial direction retaining portions 21a–24a; 21b–24b can be accurately formed during the rolling of the rollers, whereby the upper surface side and side surface side rollers 21–24 would not interfere with the radial and axial direction retaining portions 21a–24a; 21b–24b.

Accordingly, the rollers are smoothly rolled and moved in co-operation with the skew preventing effect for the upper surface side and side surface side rollers 21–24 by the action of the first and second end surface retaining portions 211–241, 212–242.

On the other hand, the end surface resin portions 16, 17 as the direction changing passage inner periphery member constituting the direction changing passage inner periphery portions 81b1–84b1, together with both the radial and axial direction retaining portions 21a–24a; 21b–24b, are integrally formed with the block body 31 by inserting the block body 31 into the molding die, so that the connected portions of the loaded roller rolling surfaces 71–74 and the direction changing passage inner periphery portions 81b1–84b1 can be continuously formed without causing irregularities, so that both the upper surface side and side surface side rollers 21–24 are smoothly rolled and moved.

Further, the returning passage forming resin portions 81a2, 82a2 and the lower surface resin portions 83a2, 84a2 as the unloaded roller returning passage member for constituting the unloaded roller returning passages 81a–84a, together with the end surface resin portion 16 and 17, the inner side resin portion 12 of the supporting leg portion and the lower surface resin portion 13 of the horizontal portion, are integrally formed with the block body 31 by inserting the block body 31 into the molding die, so that each of the connected portions between the loaded roller rolling surfaces 71–74, the direction changing passage inner periphery portions 81b1–84b1 and the unloaded roller returning passages 81a–84a can be continuously formed without causing irregularities, whereby both the upper surface side and side surface side rollers 21–24 are smoothly circulated and moved in all around a circulating passage.

Further, the direction changing passage inner periphery portions 81b2–84b2 of the end surface resin portions 16, 17 and the unloaded roller returning passage forming member of the returning passage forming resin portions 81a2, 82a2 are integrally provided with end surface guide portions 85, 86 for guiding at least one end surface of the upper surface side and side surface side rollers 21–24.

According to this structure, the end surface guide portions 85, 86 of the direction changing passage 81b and the unloaded roller returning passage 81a are continuously formed without causing irregularities, so that the skew of both the upper surface side and side surface side rollers 21–24 can be prevented in all around the circulating passage and the rollers are smoothly circulated.

On the other hand, the upper surface side rollers 21, 22 disposed on the upper surface of the track rail 1 are arranged to a portion close to a center side apart from a side end of the upper surface of the track rail 1 with a predetermined distance, while the roller rolling surfaces 61, 71; 62, 72 corresponding to the upper two rows of rollers 21, 22 are formed to the upper surfaces of the track rail 1 and the lower surface of the horizontal portion 4 of the movable block 3.

The roller returning passages 81a, 82a constituting the circulation passage for the upper rollers are arranged to portions close to a center side with respect to the roller circulating passages 83a, 84a in unloaded region corresponding to the side surface side two rows of the rollers 23, 24.

According to this invention, the upper two rows of rollers 21, 22 are arranged so as to be shifted to portions close to center side from the end portion of the upper surface of the track rail 1, so that it is sufficient to form one row of the roller rolling surface 73, 74 to the inner side surfaces of the supporting leg portions 5, 5, and the length L from the base portion of the right and left supporting leg portions 5, 5 to the lower side two rows of rollers 23, 24 can be shortened. As a result, the bending moment to be applied to the supporting leg portions due to the reaction force of the preload applied to the rollers 21–24 or an external load can be reduced.

Further, due to the moment acting in a direction spreading the supporting leg portions 5, 5, a center portion of the horizontal portion 4 is liable to be bent so as to close to the upper surface of the track rail 1. However, in the present invention, such a bending deformation of the horizontal portion 4 is suppressed by the action of the upper two rows of rollers 21, 22 disposed between the horizontal portion 4 and the upper surface of the track rail 1, whereby the spreading of the supporting leg portions 5, 5 can be sufficiently and synergistically decreased in co-operation with the reduction of the bending moment.

According to the structure described above, in a case where the preload is applied by means of the upper two rows of the rollers 21, 22 disposed to the upper surface side of the track rail 1 and the lower two rows of rollers 23, 24 disposed to the side surface side of the track rail 1 or in a case where the lifting load is applied, the deformation of the movable block 3 in a direction spreading the supporting leg portions 5, 5 can be prevented, and the degree of parallelization between the roller rolling surfaces 61, 71; 62, 72; 63, 73; 64, 74 are maintained to a constant level, whereby the non-uniformity in contacting of the rollers 21–24 can be prevented.

Further, the angle between each of the contact angle lines S1, S2 of the upper two rows of rollers 21, 22 disposed on the upper surface of the track rail 1 and the central longitudinal axial line (vertical line) V is set at almost 45° and the angle between each of the contact angle lines S3, S4 of the side lower two rows of rollers 23, 24 disposed on the side surfaces of the track rail 1 and a horizontal line H is set at almost 45° so at to upwardly direct to the track rail 1, so that the same rated load can be obtained with respect to a radial load applied from upper direction (i.e., a load in a direction so as to press the movable block 3 onto the track rail 1), lifting load and the lateral loads applied from right and left directions, whereby any of the load applied from every direction can be supported. In other words, the device can be used in any attitudes or positions, and available to wide applications.

Further, the track rail 1 having grooves each having a V-shape in cross section is used, and the roller rolling surfaces 61, 71; 62, 72; 63, 73; 64, 74 to be formed to the track rail 1 and the movable block 3 so as to correspond to the four rows of rollers 21–24 are formed to one of the inclined surface of the V-shaped groove, while the other inclined surface is used as the first and second end surface guide portions 211–241, 212–242 for guiding the roller end surfaces, whereby the end surfaces of the rollers are guided.

As a result, the locating relation between the respective V-shaped grooves can be accurately measured by using a roller pin or the like, whereby the locating relation between the respective V-shaped grooves can be molded or formed with a high accuracy. Accordingly, the upper surface side and side surface side four rows of rollers 21–24 disposed between the track rail 1 and the movable block 3 accurately contact to the roller rolling surfaces 61, 71; 62, 72; 63, 73; 64, 74 corresponding to the four rows of rollers 21–24, and the end surfaces of the rollers are accurately guided by the action of the first and second end surface guide portions 211–241;212–242.

As described above, the movable block 3 has a rigidity regardless of the direction of the loads, so that the locating relation between the track rail 1 and the movable block 3 is normally maintained to a constant level. Further, the movable block 3 is supported by the track rail 1 at a position where the preload applied to the respective four rows of rollers 21–24 and the reaction force of the preload are balanced, so that a gap between the end surface of the roller and the first and second end surface guide portions 211–241;212–242 can be normally maintained to a constant level in co-operation with the effect of accurately forming the locating relation between the respective roller rolling surfaces 61, 71; 62, 72; 63, 73; 64, 74 as described above.

In particular, the movable block 3 is formed in a shape having a high rigidity, so that a high preload can be applied. Therefore, the high rigidity of the movable block 3 and the high preload are synergistically effected to realize an effect such that the gap between the end surface of the upper surface side and side surface side rollers 21–24 and the first and second end surface guide portions 211–241; 212–242 can be maintained to a constant level. As a result, the skew preventing effect for the rollers 21–24 can be enhanced and a smooth circulation and a rolling accuracy of the rollers 21–24 can be secured.

Further, the first end surface guide portions 211, 212 for the upper rollers 21, 22 are constituted by the block body 31 per se, so that the thickness of the horizontal portion 4 can be increased, whereby the flexural rigidity of the horizontal portion 4 can be increased. Further, the rigidity of the movable block 3 can be enhanced. In addition, by enhancing the rigidity of the movable block 3, the effect of preventing the skew generation can be further synergistically improved.

Further, the roller rolling surfaces 61, 71; 62. 72; 63, 73; 64, 74 and the first and second end surface guide portions 211–241 212–242 are constituted by the grooves each having a V-shape in cross section, so that the roller rolling surfaces 61, 71; 62, 72; 63, 73; 64, 74 and the first and second end surface guide portions 211–241; 212–242 can be simultaneously finished by a grinding work. As a result, a guiding accuracy for the rollers and surface roughness of the roller rolling surfaces 61, 71 62, 72; 63, 73; 64, 74 and the first and second end surface guide portions 211–241; 212–242 are improved and a high effect in skew prevention can be obtained. In addition, the working amount for the grooves can be minimized.

In addition a screw hole 33 for fixing the movable block is provided at portions on the upper surface of both right and left end portions of the horizontal portion 31 of the movable block, and the portions are set to upper positions of the roller returning passages 83a, 84a for the lower two rows of rollers 23, 24 or set to positions close to the center side. Owing to this structure, a pitch P between the right and left screw holes 33, 33 is narrowed, whereby the screw holes are arranged to the positions close to the lower side rollers 23, 24.

In addition, the relation between a lateral width W and a height A of the track rail 1 is set so as to satisfy A/W<1, so that stability of the track rail 1 is enhanced, and simultaneously, an interference with an upper end opening portion 11a of a bolt inserting hole to be opened at a center of the upper surface of the track rail 1 is avoided.

When a lifting load in a direction lifting the movable block 3 from the track rail 1 is applied, a force in a direction detaching the movable block 3 from the track rail 1 is applied while the above described screw holes 33, 33 are acting as points of application, in contrast, a reaction force against the force is applied to the roller rolling surfaces 73, 74 for the lower two rows of rollers 23, 24. The force applied to the screw hole 33 and the reaction force constitute a relation of a couple of forces, whereby a bending moment in a direction for spreading the supporting leg portions 5, 5 will occur.

In the case of this embodiment, the upper two rows of rollers 21, 22 are arranged to portions close to a center side portion, so that an interference of the upper two rows of the rollers 21, 22 with the screw hole 33 can be avoided. Simultaneously, the screw hole 33 is formed at a portion close to the lower side rollers 23, 24, so that a distance M in the horizontal direction between the the screw hole 33 and the lower side rollers 23, 24 can be sufficiently shortened, whereby the bending moment in a direction for spreading the supporting leg portions 5, 5 can be reduced.

Figure 12:
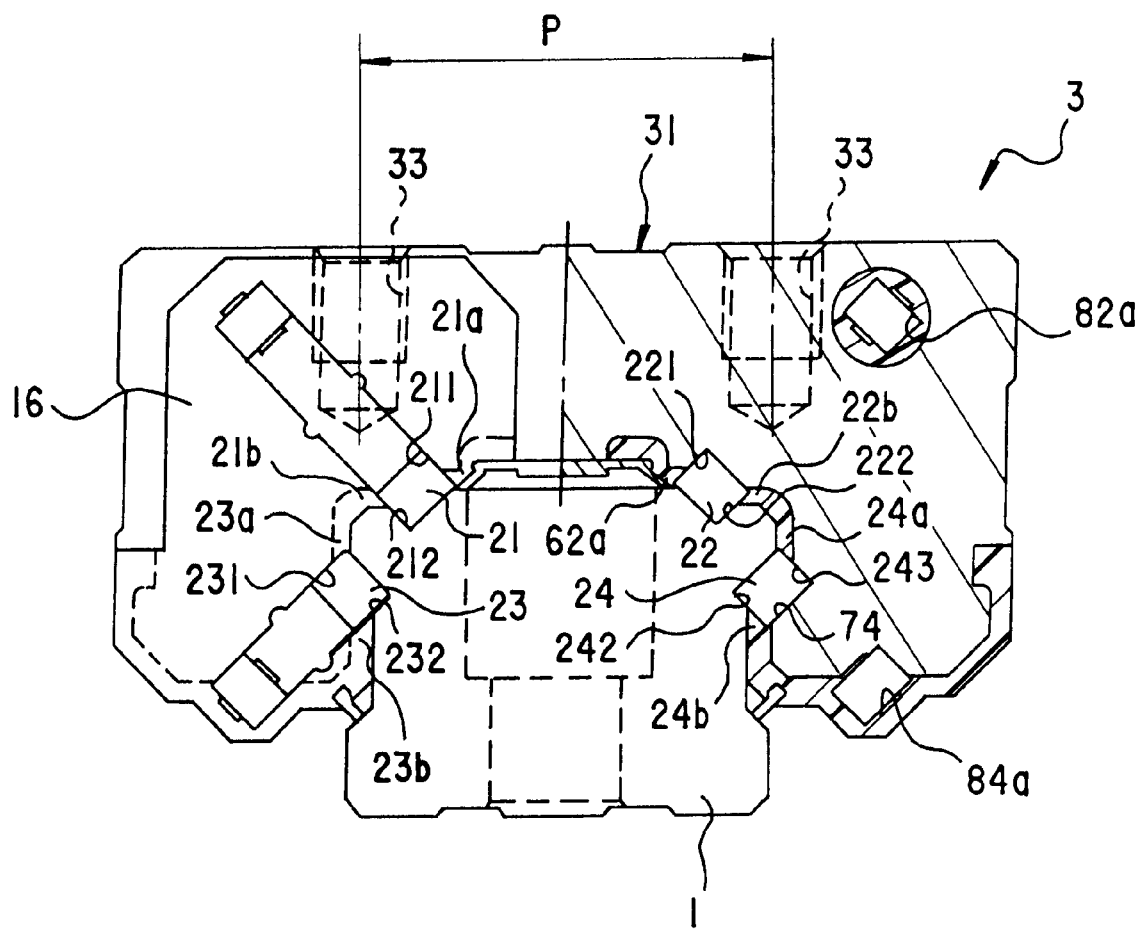
FIG. 12 is a view showing another embodiment of a linear roller guide device.

As shown in FIG. 12, when the position of this screw hole 33 is set so as to coincide with the position of the side surface side rollers 23 and 24, the distance between the screw hole 33 and the lower side rollers 23, 24 in a horizontal direction becomes zero, so that the bending moment in a direction spreading the supporting leg portions 5, 5 would not be applied, thus being advantageous. In the case shown in Figure, each of the screw holes 33 is arranged to a portion between the roller rolling surfaces 71, 72 and the roller returning passages 81a, 82a for the upper side rollers 21, 22.

Figure 13A:
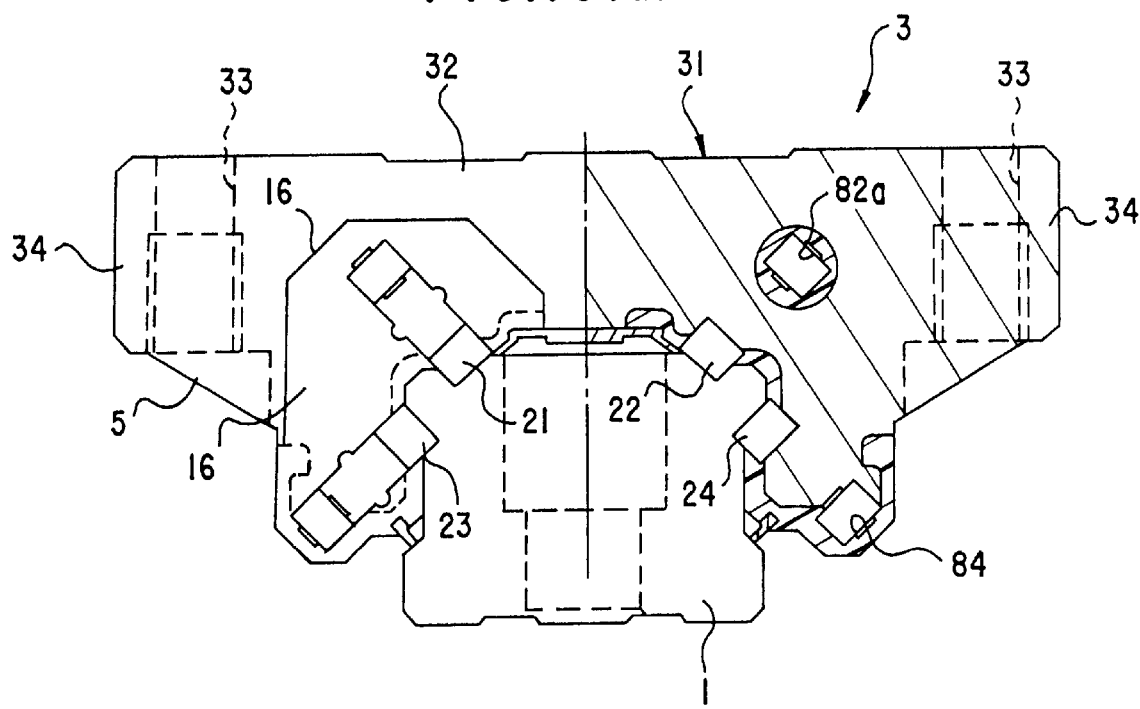
FIGS. 13(a), (b) are views showing still another embodiments of a linear roller guide device.
Figure 13B:
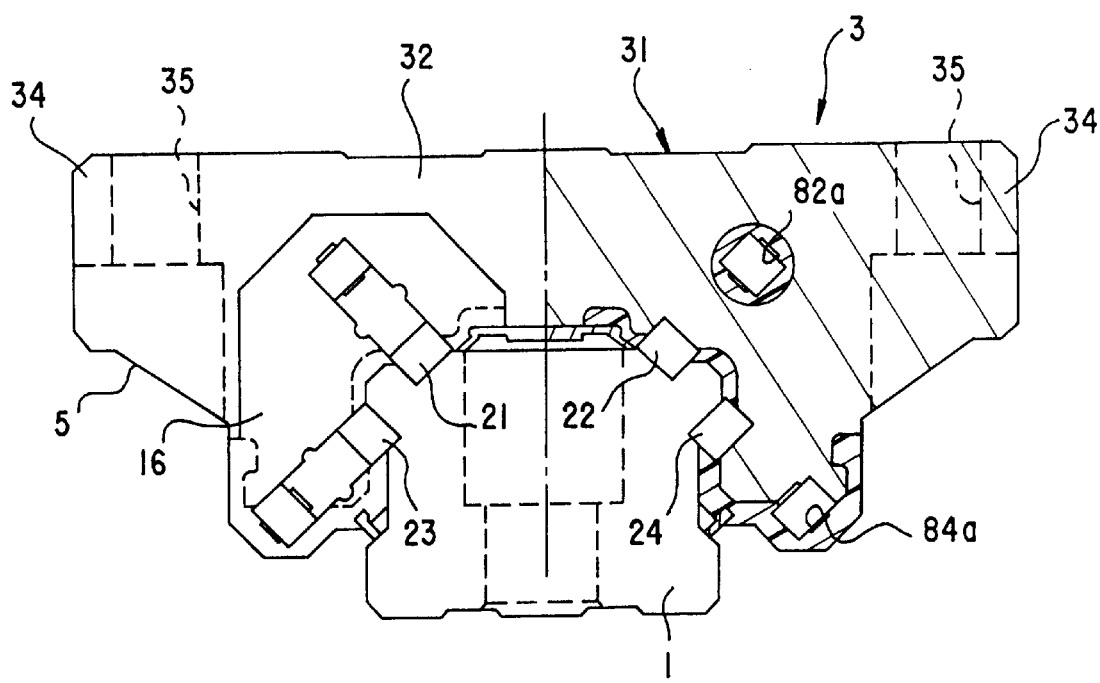

In this connection, as shown in FIG. 13, a flange portion 34 can be provided to the movable block so as to laterally project therefrom, and the screw hole 33 for fixing the movable block way also be formed to the flange portion 34.

FIG. 13(*a*) shows an example in which a screw is formed to the screw hole 33, and FIG. 13(*b*) shows an example in which a screw inserting hole 35 is formed to the flange portion 34.

In the embodiment described above, although there is shown an example in which the radial direction retaining portions and axial direction retaining portions 21a–24a, 21b–24b composed of resin materials for retaining the upper surface side rollers 21, 22 and the side surface side rollers 23, 24 are integrally formed to the block body 31, the radial direction retaining portions 21a–24a and axial direction retaining portions 21b–24b may also be formed by mechanically working the block body 31 per se as shown in FIGS. 9 and 10.

Figure 9A:
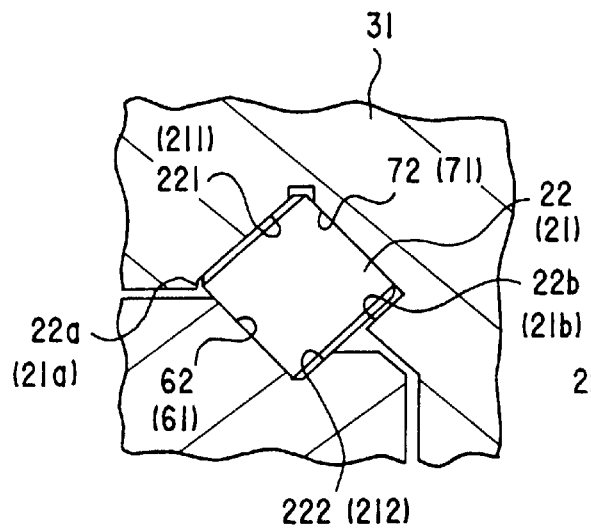
FIGS. 9(a)–(c) are views showing modifications of radial and axial direction retaining portions for the upper surface side rollers.
Figure 9B:
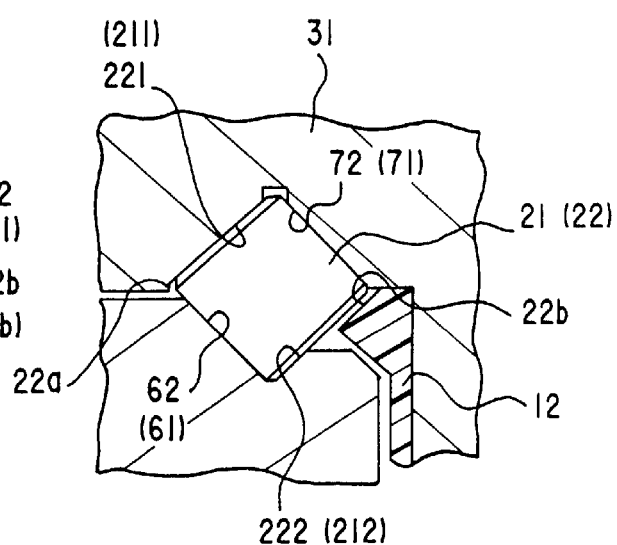
Figure 9C:
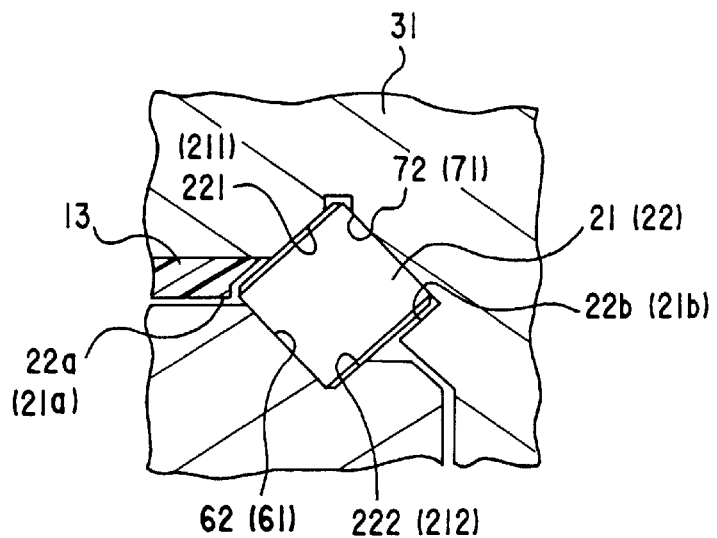

FIG. 9 shows an example of a structure for retaining the upper surface side roller 21, 22. Namely, FIG. 9(a) shows an example in which both the radial direction retaining portions 21a, 22a and the axial direction retaining portions 21b, 22b are constituted by the block body 31, FIG. 9(b) shows an example in which the radial direction retaining portions 21a, 22a are constituted by the block body 31, while the axial direction retaining portions 21b, 22b are constituted by the resin material, and FIG. 9(c) shows an example in which the radial direction retaining portions 21a, 22a are constituted by the resin material, while the axial direction retaining portions 21b, 22b are constituted by the block body 31.

Figure 10A:
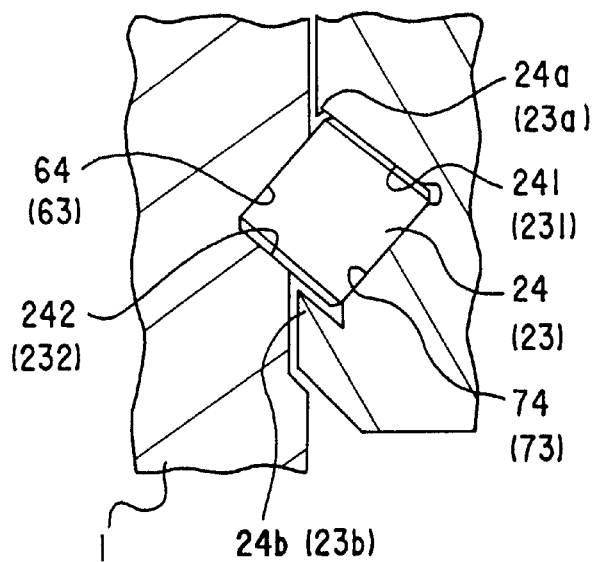
FIGS. 10(a)–(c) are views showing modifications of radial and axial direction retaining portions for the side surface side rollers.
Figure 10B:
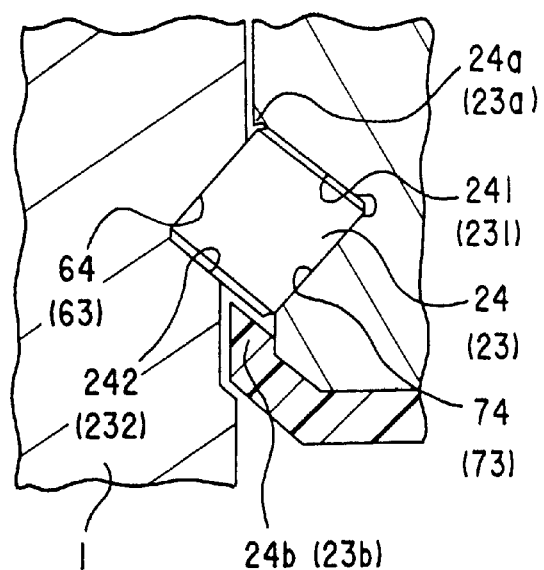
Figure 10C:
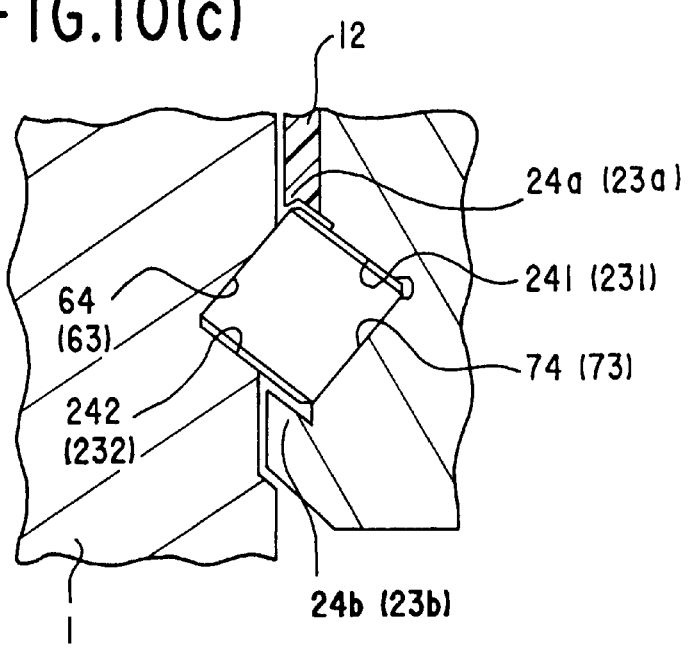

FIG. 10 shows an example of a structure for retaining the side surface side roller 23, 24. Namely, FIG. 10(a) shows an example in which both the radial direction retaining portions 23a, 24a and the axial direction retaining portions 23b, 24b are constituted by the block body 31; FIG. 10(b) shows an example in which the radial direction retaining portions 23a, 24a are constituted by the block body 31, while the axial direction retaining portions 23b, 24b are constituted by the resin material; and FIG. 10(c) shows an example in which the radial direction retaining portions 23a, 24a are constituted by the resin material, while the axial direction retaining portions 23b, 24b are constituted by the block body 31.

FIG. 11 shows another example of a structure of the first end surface guide portion for the upper surface side and side surface side rollers.

Figure 11A:
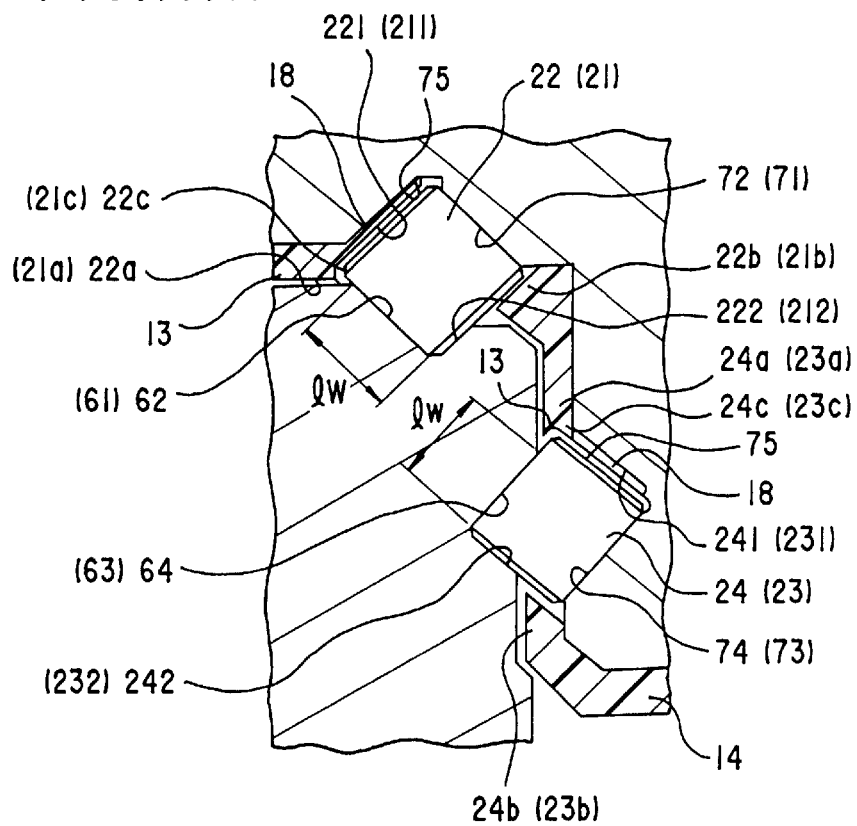
FIGS. 11(a), (b) are views showing another embodiments of a first end surface guide portion.

FIG. 11(a) shows a structure in which the first end surface guide portions 211–241 are integrally formed with the block body 31 by inserting the block body 31 into the molding die.

According to this structure, the first end surface guide portions 21–24 can be accurately positioned, so that the gap between the roller end surface and the first end surface guide portions 211–241 can be further decreased without impairing the circulating motion of the rollers 21–24, whereby the skew preventing effect for the rollers 21–24 can be enhanced.

In particular, in this embodiment, the first end surface guide portions 211–241 are constituted by resin member 18, and the roller end surfaces are guided by the resin member 18, so that a friction resistance is decreased whereby a smoothness in roller guiding can be increased. Furthermore, the roller end surface would not wear, so that the skew prevention can be stably secured.

In the example shown in Figure, a guide wall 75 is constituted by the inclined surface of the V-shaped groove, and the inclined surface opposing to another inclined surface to which the roller rolling surfaces 71–74 are formed. The guide wall 75 is covered with the resin material having a predetermined thickness.

Figure 11B:
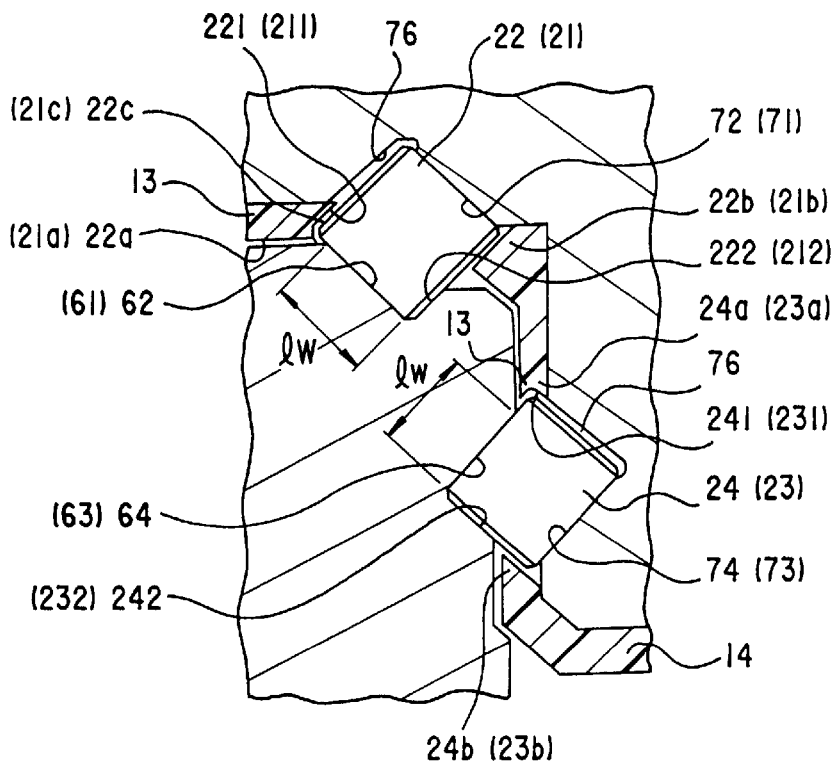

FIG. 11(b) shows an example in which the first end surface guide portions 211–241 are constituted by the radial direction retaining portions 21a–24a.

Namely, the guide wall 76 opposing to the roller end surface in a non-contact state is provided to one side periphery of the roller rolling surfaces 71–74 formed to the movable block 3, the radial direction retaining portions 21a–24a are provided to end portions of the guide wall 76, and the first end portion guide portions 211–241 contacting to a circumferential portion of the roller end surface are constituted by opposing surfaces of the radial direction retaining portions 21a–24a, the opposing surfaces being opposed to the roller end surface.

According to this structure, contact areas of the first end surface guide portions 211–241 and the roller end surface are decreased, so that a friction resistance can be decreased, whereby a smoothness in roller circulation can be increased.

In the respective embodiments described above. there has been explained examples in which the roller returning passages 83a, 84a in the unloaded region for the side surface side rollers 23, 24 are constituted by the V-shaped grooves formed to the lower end surfaces of the supporting leg portions 5, 5 of the movable block 3.

Figure 14A:
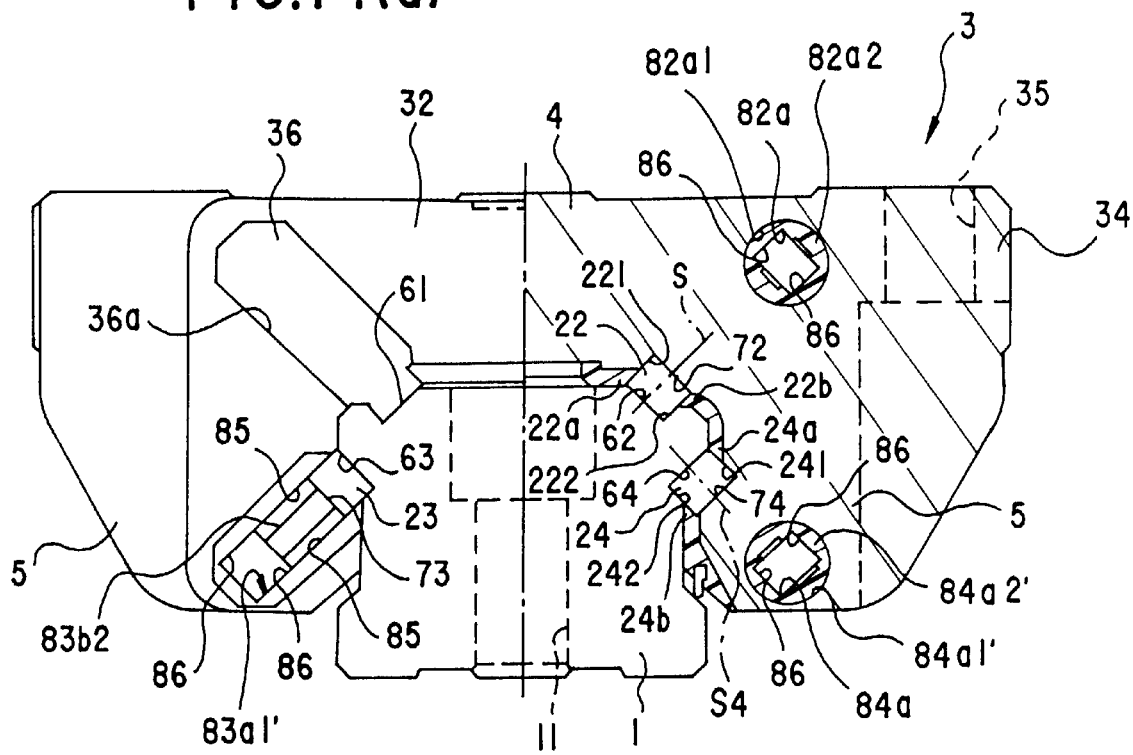
FIG. 14(a) is a view showing still another embodiment of a linear roller guide device.
Figure 14B:
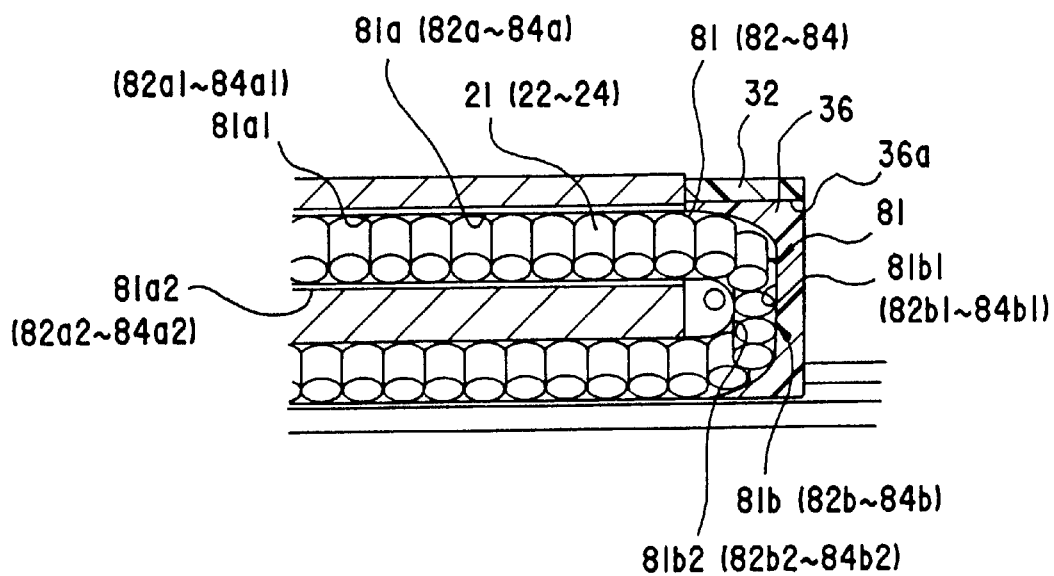
FIG. 14(b) is a view partially in section of a direction changing passage shown in FIG. 14(a).
Figure 15A:
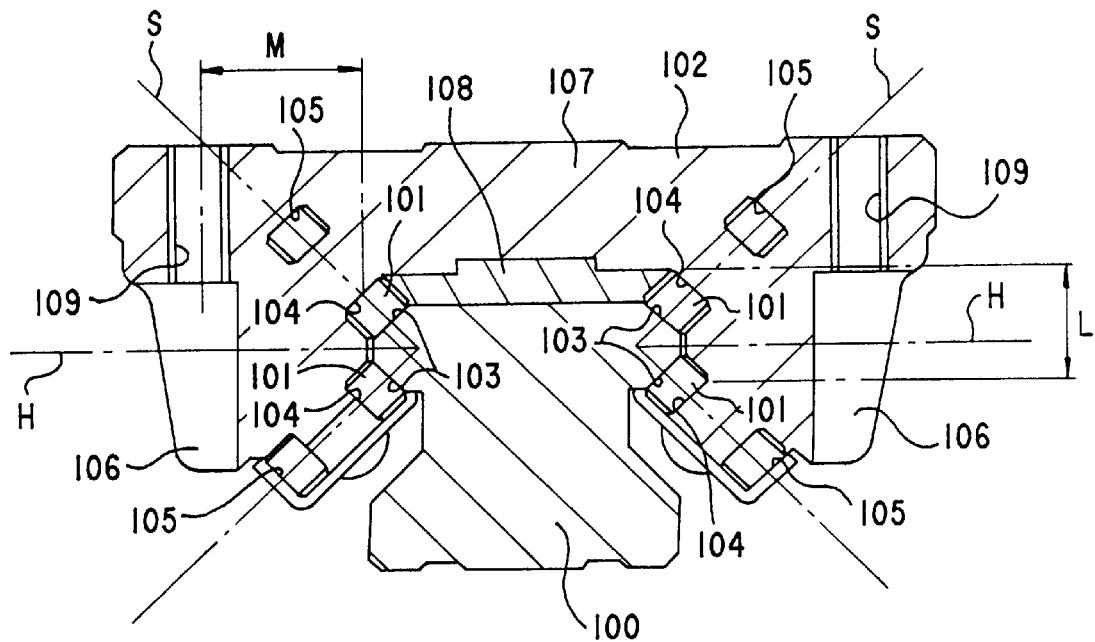
FIG. 15 is a view showing a conventional linear roller guide device.
Figure 15B:
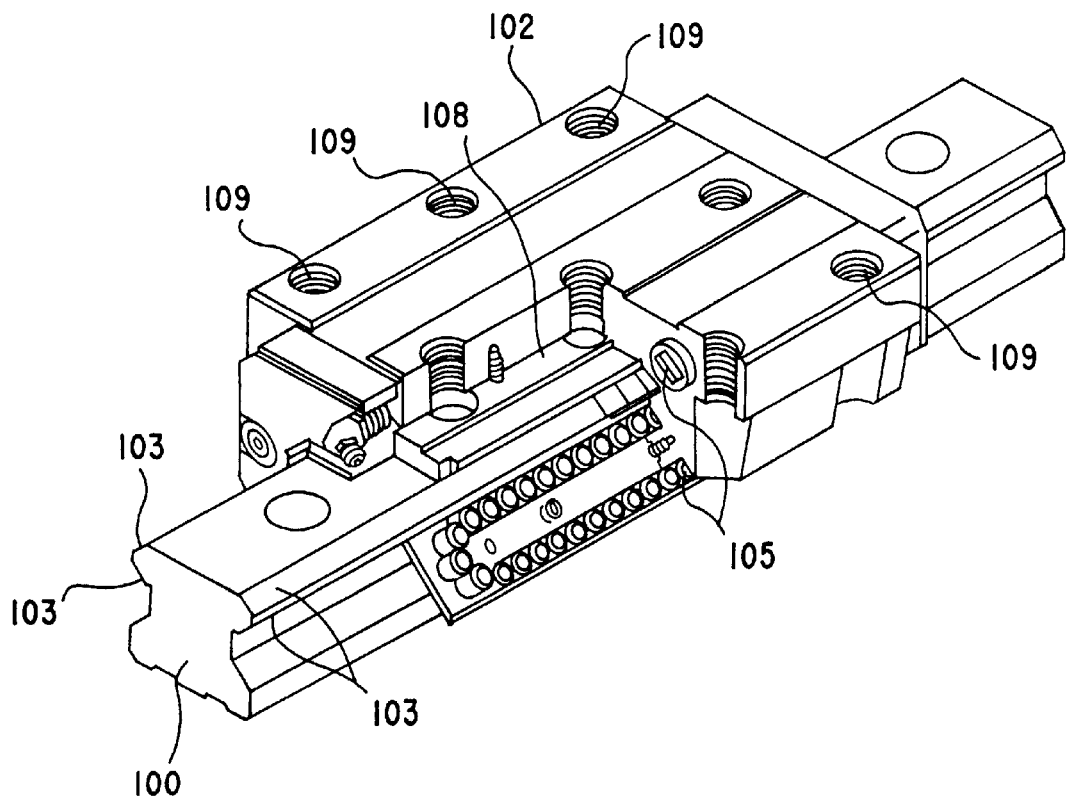

However, in the same manner as in the roller returning passages 81a, 82a for the upper surface side rollers 21 and 22, as shown in FIG. 14, the roller returning passages 83a, 84a way also be constituted by covering the inner peripheral portions of the penetration bores 83a1', 84a1' with the resin portions 83a2', 84a2'.

In the case of this embodiment, the resin would not enter or flow toward the lower end surfaces and outer side surfaces of the supporting leg portions 5, 5 of the movable block 3.

Further, in the case of the former embodiment. the direction changing passages 81b–84b are constituted by the side cover 32 to be attached to both end portions of the movable block 3. However, in the case of this embodiment, the side cover 32 is integrally formed with the block body 31, and a deflector 36 for constituting only the direction changing passage outer periphery portions 81b1–84b1 is used. The deflector 36 is attached to a recessed portion 36a to which the inner periphery guide portions 81b2–84b2 of the direction changing passages 81b–84b of the side cover 32 is provided.

According to the present invention as described above, the radial direction retaining portion is engaged with only a periphery of the one end surface of the roller, and the second end surface guide portion is provided to the other side periphery of the roller rolling surface formed to the track rail, so that a peripheral surface of the roller except the engaging portion for engaging with the radial direction retaining portion can be contacted to the roller rolling surface formed to the track rail so that the end surface is closely contacted to the second end surface guide portion, whereby the contact length of the roller can be sufficiently secured in a long length. Accordingly, the high rigidity characteristic of the roller can be sufficiently utilized.

When the first end surface guide portion is integrally formed with a member for constituting a block body of the movable block, the first end surface guide portion can be worked so as to have a high rigidity and high accuracy, and the end surfaces of the roller are guided in a portion between the first end surface guide portion and the second end surface guide portion provided to the track rail also having a high rigidity, whereby the skew generation can be further securely prevented.

When the first end surface guide portion is integrally formed with the block body by inserting the block body into a molding die, the end surface guide portions can be accurately positioned without causing any attaching error, the gap between the roller end surface and the first end surface guide portion can be further decreased without impairing the circulating motion of the rollers, so that the skew preventing effect for the roller can be enhanced.

A guide wall opposing to the roller end surface in a non-contact state is provided to one side periphery of the roller rolling surface formed to the movable block, the radial direction retaining portion is provided to an end portion of the guide wall, and the first end surface guide portion contacting to a circumferential portion of the roller end surface is constituted by an opposing surface of the radial direction retaining portion, the opposing surface being opposed to the roller end surface.

According to this structure, contact areas of the first end surface guide portion and the roller end surface are decreased, so that a friction resistance can be decreased whereby a smoothness in roller circulation can be increased.

When both the first and second end surface guide portions are integrally formed with the block body by inserting the block body into the molding die, both the radial and axial direction retaining portions can be accurately positioned without causing any attaching error, so that a predetermined gap between the roller and the radial direction retaining portion or the axial direction retaining portion can be accurately formed during the rolling of the rollers, whereby the roller would not interfere with the radial and axial direction retaining portions. Accordingly, the rollers are smoothly rolled and moved in co-operation with the skew preventing effect for the rollers by the action of the first and second end surface retaining portions.

On the other hand, when the direction changing passage inner periphery member, together with both radial and axial direction retaining portions, is integrally formed with the block body by inserting the block body into the molding die, a connected portion of the loaded roller rolling surface and the direction changing passage inner periphery portion can be continuously formed without causing irregularities, so that the rollers can be smoothly circulated.

When the unloaded roller returning passage member, together with the direction changing passage inner periphery member and both the radial and axial direction retaining portions, is integrally formed with the block body by inserting the block body into the molding die, each of the connected portions between the loaded roller rolling surface, the direction changing passage inner periphery portion and the unloaded roller returning passage can be continuously formed without causing irregularities, so that the rollers can be smoothly circulated in all around the circulating passages.

When the direction changing passage inner periphery member and the unloaded roller returning passage member are integrally provided with an end surface guide portion for guiding the roller, the end surface guide portions of the direction changing passage inner periphery member and the unloaded roller returning passage member are continuously formed without causing irregularities, so that the skew of the roller can be prevented all around the circulating passages and the rollers can be smoothly circulated.

When the upper two rows of rollers are arranged to portions close to center side from the end portions of the upper surface of the track rail and the lower two rows of the rollers are arranged to upper portions of the right and left side surfaces of the track rail, the lengths from the base portion of the right and left supporting leg portions of the movable block to the lower side rollers can be shortened in comparison with a conventional case where the two rows of rollers are arranged to the right and left side surfaces of the track rail, respectively.

Accordingly, even if the reaction force of the preload applied to the roller or the lateral load acting in a direction so as to displace the movable block in a horizontal direction with respect to the track rail is applied, it becomes possible to decrease the bending moment acting in a direction so as to spread the supporting leg portions.

Further, due to the moment acting in a direction spreading the supporting leg portions, a center portion of the horizontal portion is bent so as to close to the upper surface of the track rail. However, in the present invention, a bending deformation of the horizontal portion is suppressed by the action of the upper two rows of rollers disposed between the horizontal portion and the upper surface of the track rail, whereby the spreading of the supporting leg portions can be sufficiently decreased in co-operation with the reduction of the bending moment.

As described above, even if the preload is applied to the roller or the lateral load in a horizontal direction is applied, the deformation in a direction spreading the supporting leg portions of the movable block can be prevented and a degree of parallelization between the opposing roller rolling surfaces can be maintained to a constant level, whereby the rollers can be smoothly circulated in co-operation with the effect of preventing the skew of the rollers by the action of the first and second end surface guide portions.

INDUSTRIAL APPLICABILITY

As described above, the linear roller guide device according to the present invention is widely applicable to linear guide mechanisms for various industrial equipments such as machine tool, robot operating system, inspecting or measuring apparatus, or the like.

I claim:

1. A linear roller guide device in which a movable block is guided along a track rail through four rows of rollers disposed on said track rail, wherein said movable block comprises a horizontal portion opposing to an upper surface of said track rail and supporting leg portions projected downwardly from both end portions of said horizontal portion so as to oppose to right and left side surfaces of said track rail, wherein said track rail is provided with four rows of roller rolling surfaces for rolling and guiding the rollers in an entire range of said track rail in which the movable block is moved, and wherein, on the other hand, said movable block comprises four rows of roller rolling surfaces opposing to the roller rolling surfaces formed to said track rail for rollingly clamping the four rows of rollers and four rows of roller circulating passages provided at unloaded region for circulating the rollers clamped between the roller rolling surfaces formed to the track rail and the movable block from one end portion to the other end portion of the roller rolling surface of said movable block, said linear motion guide device being characterized in that upper two rows of rollers among said four rolls of rollers are arranged in the upper surface of said track rail at portions spaced from side ends of the upper surface of said track rail, while roller rolling surfaces corresponding to said upper two rows of rollers are formed to the upper surface of said track rail and the lower surface of said horizontal portion of the movable block, that said lower two rows of rollers among the four rows of rollers are arranged such that one row of rollers is disposed to an upper portion of right and left side surfaces of said track rail, respectively, while roller rolling surfaces corresponding to said lower two rows of rollers are formed to the right and left side surfaces of said track rail and inner side surfaces of said supporting leg portions of the movable block, that each of said upper two rows of rollers has a structure in which a line orthogonal to a rotation axis of the roller is inclined with respect to a vertical line with a predetermined inclination angle, and that each of said lower two rows of rollers has a structure in which a line orthogonal to a rotation axis of the roller is inclined with respect to a horizontal line with a predetermined inclination angle so as to upwardly extend towards a side of the track rail.

2. A linear roller guide device according to claim 1, wherein said upper two rows of rollers are arranged to portions close to a center side portion deviated from side ends of the upper surface of said track rail, while the roller circulating passages in unloaded region are also arranged to portions close to the center side portion with respect to the roller circulating passages in unloaded region corresponding to the lower two rows of the rollers and wherein a screw hole for fixing said movable block is provided at portions on the upper surface of right and left end portions of said horizontal portion of the movable block, and the portions are set to upper positions of the roller circulating passages in unloaded region for the lower two rows of rollers or set to positions close to the center side.

3. A linear roller guide device according to claim 1 or 2, wherein an angle between a line orthogonal to a rotation axis of each of said upper two rows of rollers and a vertical line is set at almost 45°.

4. A linear roller guide device according to claim 1 or 2, wherein an angle between a line orthogonal to a rotation axis of each of said lower two rows of rollers and a horizontal line is set at almost 45°.

5. A linear roller guide device according to claim 1 or 2, wherein said track rail has a track groove having a V-shape in cross section comprising two inclined surfaces, and said roller rolling surfaces to be formed to said track rail and said movable block so as to correspond to said four rows of rollers are formed to one of said inclined surfaces, while the other inclined surface is used as a guide surface for guiding the roller end surfaces.

6. A linear roller guide device according to claim 5, wherein said rollers contact to said roller rolling surfaces at an entire length of the roller.

7. A linear roller guide device according to claim 1 or 2, wherein said rollers are applied with preload.

8. A linear roller guide device according to claim 1 or 2, wherein a first end surface guide portion for guiding one end surface of said roller is provided to one side periphery of said roller rolling surface formed to said movable block, while a second end surface guide portion for guiding the other end surface of said roller is provided to the other side periphery of said roller rolling surface formed to said track rail, wherein a radial direction retaining portion having a projection for preventing the roller from falling out in a radial direction by being engaged with a peripheral corner portion of the roller end surface is provided to one side periphery of said roller rolling surface formed to the track rail, while said roller is contacted to the roller rolling surface formed to the track rail in an almost entire contact length in a peripheral surface of the roller except an engaging width required for engaging with said radial direction retaining portion, and wherein, on the other hand, an axial direction retaining portion for preventing the roller from falling out in an axial direction is provided to a side periphery of the roller rolling surface formed to the movable block, said side periphery opposing to the side periphery to which the first end surface guide portion is provided.

9. A linear roller guide device according to claim 8, wherein said first end surface guide portion is integrally formed with a member for constituting a block body of said movable block.

10. A linear roller guide device according to claim 8, wherein said first end surface guide portion is constituted by resin member which is integrally formed with the block body by inserting the block body into a molding die.

11. A linear roller guide device according to claim 8, wherein a guide wall opposing to said roller end surface in a non-contact state is provided to one side periphery of said roller rolling surface formed to said movable block, said radial direction retaining portion is formed to an end portion of said guide wall, and said first end surface guide portion contacting to a circumferential portion of the roller end surface is constituted by an opposing surface of the radial direction retaining portion, the opposing surface being opposed to said roller end surface.

12. A linear roller guide device according to claim 8, wherein both said radial and axial direction retaining portions are integrally formed with the block body by inserting the block body into a molding die.

13. A linear roller guide device according to claim 8, wherein the roller circulating passage in unloaded region comprises an unloaded roller returning passage extending in an axial direction and a direction changing passage for connecting both ends of the unloaded roller returning passage to both ends of a roller rolling passage in loaded region to be formed between the opposing roller rolling surfaces of said track rail and said block body and wherein a direction changing passage inner periphery member for constituting an inner periphery portion of said direction changing passage, together with both radial and axial direction retaining portions, are integrally formed with said block body by inserting the block body into a molding die.

14. A linear roller guide device according to claim 13, wherein an unloaded roller returning passage member for constituting the unloaded roller returning passage, together with said direction changing passage inner periphery member and both the radial and axial direction retaining portions, are integrally formed with said block body by inserting the block body into the molding die.

15. A linear roller guide device according to claim 14, wherein said direction changing passage inner periphery member and said unloaded roller returning passage member are integrally provided with an end surface guide portion for guiding at least one end surface of the roller.

* * * * *